(12) United States Patent
Meure et al.

(10) Patent No.: US 11,285,678 B2
(45) Date of Patent: Mar. 29, 2022

(54) MODULAR TOOL INSERTS FOR COMPOSITE PART MANUFACTURING AND RELATED METHODS

(71) Applicant: The Boeing Company, Chicago, IL (US)

(72) Inventors: Sam Meure, Fisherman's Bend (AU); Thomas Wilson, Beaumaris (AU); Paul D. Evans, Melbourne (AU); Sarah Pearn, Southbank (AU)

(73) Assignee: The Boeing Company, Chicago, IL (US)

( * ) Notice: Subject to any disclaimer, the term of this patent is extended or adjusted under 35 U.S.C. 154(b) by 526 days.

(21) Appl. No.: 16/161,878

(22) Filed: Oct. 16, 2018

(65) Prior Publication Data
US 2020/0114597 A1  Apr. 16, 2020

(51) Int. Cl.
*B29C 70/48* (2006.01)
*B29C 70/54* (2006.01)
(Continued)

(52) U.S. Cl.
CPC .......... *B29C 70/48* (2013.01); *B29C 70/545* (2013.01); *B29K 2307/04* (2013.01)

(58) Field of Classification Search
CPC ....... B29C 70/48; B29C 70/44; B29C 70/545; B29C 33/306; B29K 2307/04; B29B 11/16
See application file for complete search history.

(56) References Cited

U.S. PATENT DOCUMENTS 5,037,599 A * 8/1991 Olson .................... B29C 51/28
                                                      264/510
5,648,109 A  7/1997 Gutowski et al.
(Continued)

FOREIGN PATENT DOCUMENTS

| EP | 2219842 | 8/2010 |
| EP | 2727718 | 5/2014 |
| WO | 2009066064 | 5/2009 |

OTHER PUBLICATIONS

European Patent Office, "Extended European Search Report", issued in connection with application No. 19197519.2 dated Mar. 17, 2020, 7 pages.

*Primary Examiner* — Joseph S Del Sole
*Assistant Examiner* — Baileigh Kate Darnell
(74) *Attorney, Agent, or Firm* — Hanley, Flight & Zimmerman, LLC

(57) ABSTRACT

Modular tool inserts for composite part manufacturing and related methods are described herein. An example method includes disposing a preform and a diaphragm assembly above a tool housing and disposing the diaphragm assembly on an upper perimeter surface of the tool housing that defines a cavity. The tool housing includes a docking station and a modular tool insert removably coupled to the docking station. The modular tool insert includes a mold disposed within the cavity. The method includes applying a vacuum within the cavity that pulls the diaphragm assembly, along with the preform, into the cavity such that the preform conforms to a shape of the mold. The method includes removing excess portions of the diaphragm assembly from around the modular tool insert and removing the modular tool insert, along with the diaphragm assembly and the preform, from the docking station.

20 Claims, 12 Drawing Sheets

(51) Int. Cl.
  *B29C 33/30*   (2006.01)
  *B29K 307/04*   (2006.01)

(56) References Cited

U.S. PATENT DOCUMENTS

| | | | | |
|---|---|---|---|---|
| 5,824,249 | A | * | 10/1998 | Leitch .................. B29C 33/306 |
| | | | | 264/219 |
| 2002/0185785 | A1 | | 12/2002 | Thrash et al. |
| 2010/0269978 | A1 | * | 10/2010 | Marengo ............. B29C 67/0037 |
| | | | | 156/212 |
| 2011/0014315 | A1 | * | 1/2011 | Okoli .................... B29C 70/542 |
| | | | | 425/405.1 |
| 2011/0309547 | A1 | * | 12/2011 | D'Acunto ............. B29C 70/443 |
| | | | | 264/293 |
| 2012/0040327 | A1 | | 2/2012 | Kohl et al. |
| 2014/0127471 | A1 | * | 5/2014 | Matsubara .............. B32B 27/00 |
| | | | | 428/172 |
| 2014/0175709 | A1 | * | 6/2014 | Blackburn ............ B29C 51/145 |
| | | | | 264/511 |
| 2016/0031164 | A1 | * | 2/2016 | Downs ................ B29C 33/0016 |
| | | | | 428/12 |
| 2018/0104863 | A1 | * | 4/2018 | Cottrell ............... B29C 33/3842 |
| 2021/0023799 | A1 | * | 1/2021 | Santoni .................. B29C 70/44 |

\* cited by examiner

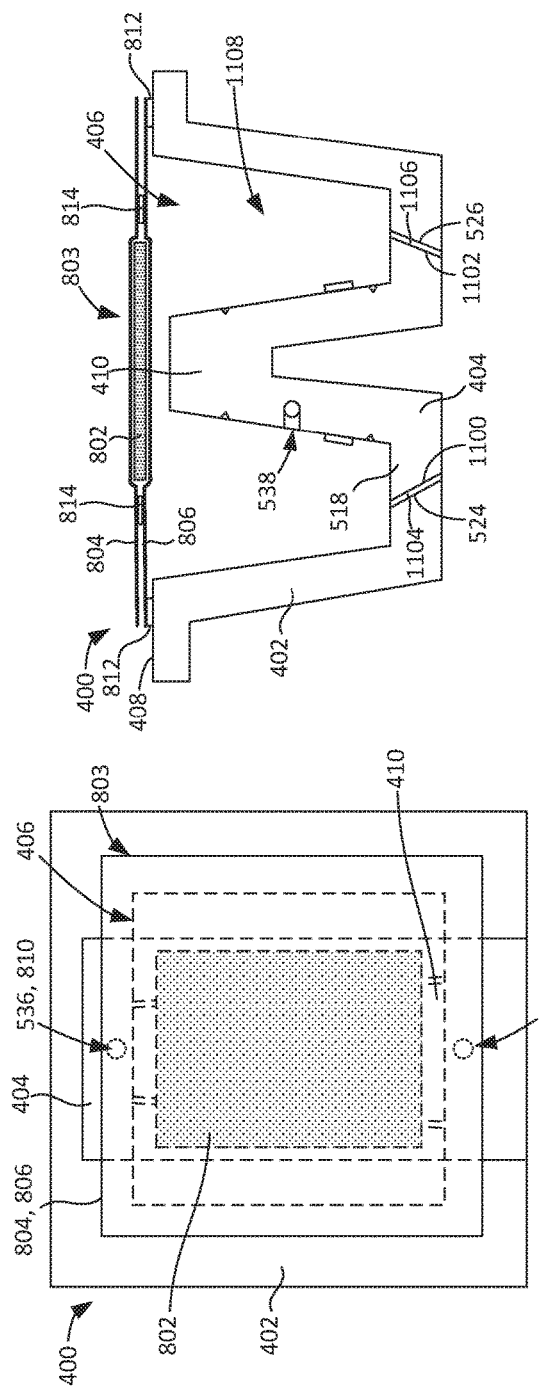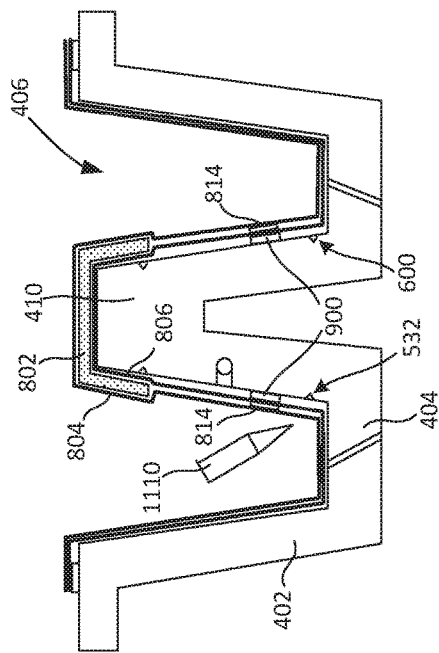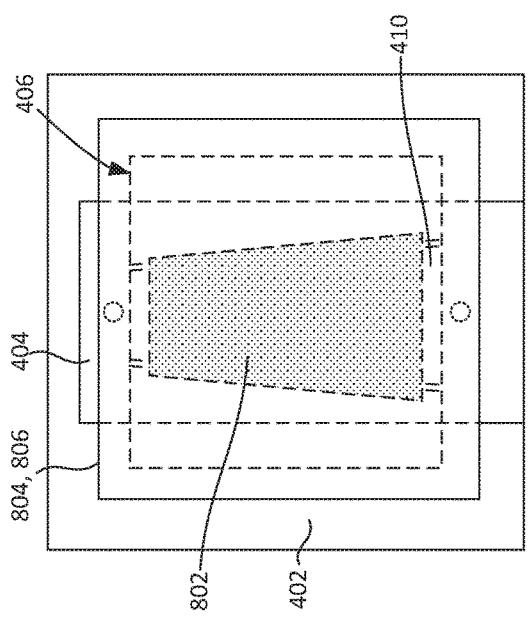

MODULAR TOOL INSERTS FOR COMPOSITE PART MANUFACTURING AND RELATED METHODS

FIELD OF THE DISCLOSURE

This disclosure relates generally to manufacturing and, more particularly, to modular tool inserts for composite part manufacturing and related methods.

BACKGROUND

Many composite parts, such as those on aircraft, are manufactured using a double-diaphragm forming process. This process involves disposing a preform between a tool mold and a diaphragm or between two diaphragms. The diaphragm(s), along with the preform, are disposed on the top of a tool housing that has a cavity. A mold having a desired shape of the final part is located within the cavity. A vacuum is then formed in the cavity that pulls the diaphragm(s), along with the preform, into the cavity and around the mold. The preform conforms to the shape of the mold. Liquid resin is infused with the preform to harden or set the preform such that it retains the shape of the mold.

SUMMARY

An example method disclosed herein includes disposing a preform and a diaphragm assembly above a tool housing and disposing the diaphragm assembly on an upper perimeter surface of the tool housing. The tool housing defines a cavity. The tool housing includes a docking station and a modular tool insert removably coupled to the docking station. The modular tool insert includes a mold disposed within the cavity. The method further includes forming the preform onto the mold by applying a vacuum within the cavity that pulls the diaphragm assembly, along with the preform, into the cavity such that the preform conforms to a shape of the mold. The method also includes removing excess portions of the diaphragm assembly from around the modular tool insert and removing the modular tool insert, along with the diaphragm assembly and the preform, from the docking station.

An example tool housing for use in a composite part manufacturing process is disclosed herein. The tool housing includes a docking station and a modular tool insert removably coupled to the docking station. The docking station and the modular tool insert, when coupled, form a cavity with an upper perimeter surface around the cavity. The modular tool insert includes a mold. The mold is disposed within the cavity when the modular tool insert is coupled to the docking station.

An example modular tool insert disclosed herein includes a first end block, a second end block, and a mold coupled between the first end block and the second end block. The first and second end blocks are shaped to be received by a docking station.

BRIEF DESCRIPTION OF THE DRAWINGS

FIG. 8 shows example sealants that may be used during the example process.

FIGS. 10A-10F are top views at different phases of an example composite part manufacturing process using the example modular tool insert of FIG. 4.

FIGS. 11A-11F are cross-sectional views corresponding to the different phases in the example process in FIGS. 10A-10F.

Figure 1:
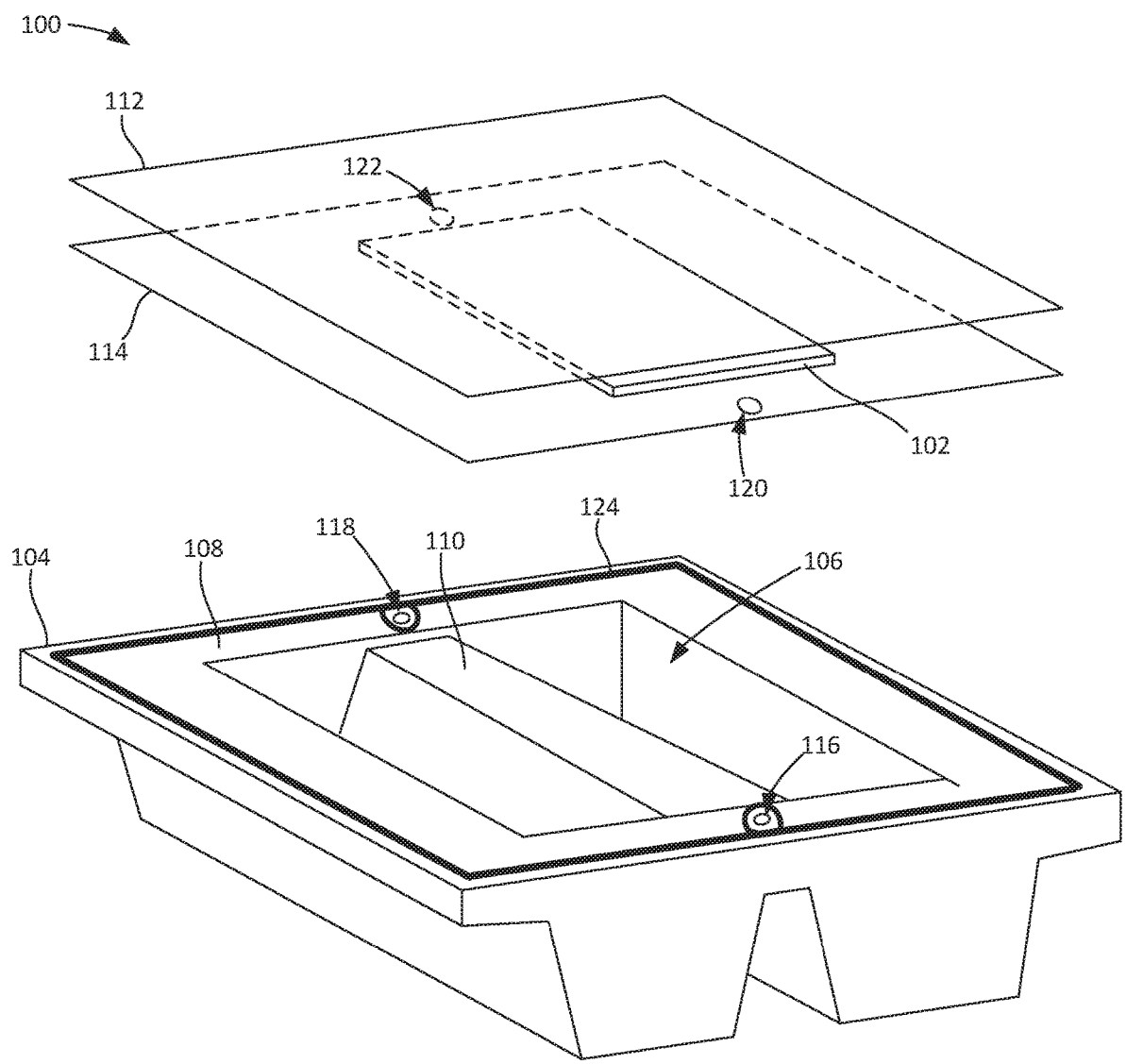
FIG. 1 illustrates a known diaphragm tooling system including a tool housing.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Disclosed herein are example modular tool inserts and example manufacturing processes that may utilize the modular tool inserts to manufacture parts, such as composite parts. The example modular tool inserts can be advantageously used during multiple phases of a manufacturing process, such as resin infusion and/or cured part trimming, which eliminates or reduces time typically required for moving a part between various tools (such as a separate trim fixture) as is done in known processes. Further, the example modular tool inserts enable less expensive tools to be utilized during the manufacturing process, which reduces the overall costs for manufacturing a part. Also, using the example modular tool inserts enables more parts to be processed at the same time, which increases production rates. Additionally, use of the modular tool insert increases efficiency of a tool package, because only the part of the tool package (e.g., the modular tool insert with the tool mold) used during a particular process is present during that particular process. As such, certain other parts of the tool package, such as a docking station, do not need to be used or carried through that particular process, which would otherwise create inefficiencies. For example, by not having the docking station in an oven during a curing phase, less energy is needed to heat the preform, which reduces costs and time associated with this phase of the process.

Before describing the example modular tool inserts and related processes in detail, a brief description of a known tooling system and composite part manufacturing process is provided below. FIG. 1 shows a known diaphragm tooling system 100 that can be used during a composite part manufacturing process. The system 100 is used to form a composite part or component from a preform 102. The preform 102 is constructed of fibrous layers (or plies). During the manufacturing process, the preform 102 is shaped, via a mold, into a desired shape. In some instances, liquid resin is injected into the preform 102 and the preform 102 is cured. Instead of resin infusion, other process include the use of pre-impregnated carbon fabric or a wet layup. The curing process sets or solidifies the liquid resin, thereby binding the fibers of the preform 102 and stabilizing the preform 102 into the desired shape. The hardened preform 102 may then be further processed (e.g., trimmed, painted, etc.) to form the final composite part. This process is used to manufacture composite parts for a wide variety of industries and applications.

The system 100 utilizes a tool housing 104 (sometimes referred to as a forming tub) to form or shape the preform 102 and hold the preform 102 while curing. The tool housing 104 is constructed of a single piece of thermally resistant material, such as steel, that can withstand the temperature changes in an oven, as described in further detail herein. The tool housing 104 forms a cavity 106. The tool housing 104 has an upper perimeter surface 108 around the cavity 106. The tool housing 104 also includes a mold 110 (e.g., a mandrel) disposed the cavity 106. The mold 110 extends from a bottom wall or surface of the tool housing 104. The mold 110 has a shape corresponding to the desired shape of the final part to be produced. In this example the mold 110 has a trapezoidal cross-section.

During the manufacturing process, the system 100 utilizes an upper diaphragm 112 and a lower diaphragm 114. The preform 102 is to be disposed between the upper and lower diaphragms 112, 114. The upper and lower diaphragms 112, 114 are constructed of thin, flexible material, such as nylon, silicone, or polypropylene. In some instances, the edges of the upper and lower diaphragms 112, 114 are connected, such that the upper and lower diaphragms 112, 114 form a bag around the preform 102. Such a bag can be constructed of two separate diaphragms, or can be constructed of a single piece of material.

As mentioned above, in some instances, liquid resin is to be infused into the preform 102 (which may occur after the forming phase described below). In particular, liquid resin is to be injected into and/or drawn through the space between the upper and lower diaphragms 112, 114 such that the liquid resin flows though the preform 102 and is infused into the material of the preform 102. As shown in FIG. 1, the tool housing 104 includes a resin inlet port 116 and a resin outlet port 118 machined into the upper perimeter surface 108. The lower diaphragm 114 includes an inlet opening 120 and an outlet opening 122. When the lower diaphragm 114 is disposed on the upper perimeter surface 108 of the tool housing 104, the inlet opening 120 aligns with the resin inlet port 116 and the outlet opening 122 aligns with the resin outlet port 118. A supply of liquid resin flows from the resin inlet port 116, through the space between the upper and lower diaphragms 112, 114 and through the preform 102, and toward the resin outlet port 118.

During the forming process, the lower diaphragm 114 is to be sealed onto the tool housing 104. As shown in FIG. 1, a sealant 124, such as double-sided tape, is disposed around the upper perimeter surface 108 of the tool housing 104. When the lower diaphragm 114 contacts the sealant 124, a sealed chamber is formed by the cavity 106 between the lower diaphragm 114 and the tool housing 104. The sealant 124 also encircles the resin inlet and outlet ports 116, 118.

Figure 2A:
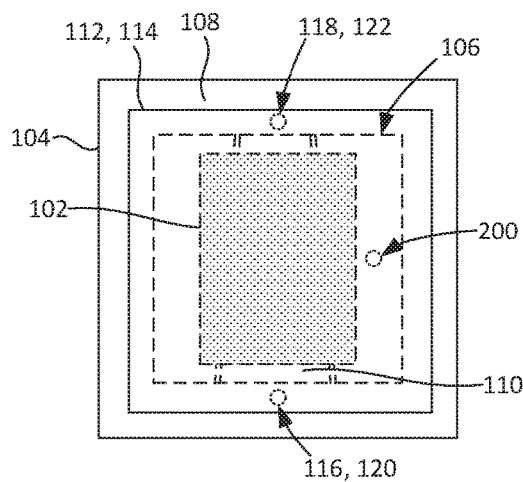
FIGS. 2A-2C are top views at different phases of a known process to manufacture a composite part using the diaphragm tooling system of FIG. 1.
Figure 3A:
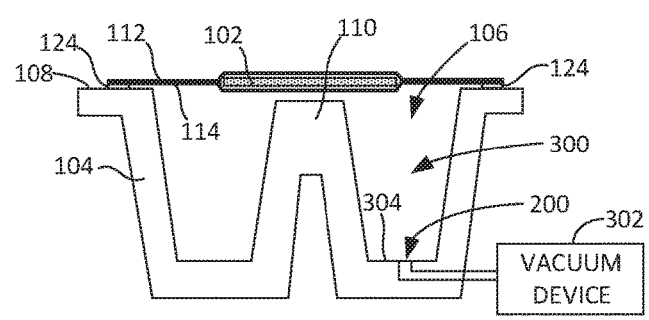
FIGS. 3A-3C are cross-sectional views corresponding to the different phases of the process in FIGS. 2A-2C.
Figure 2B:
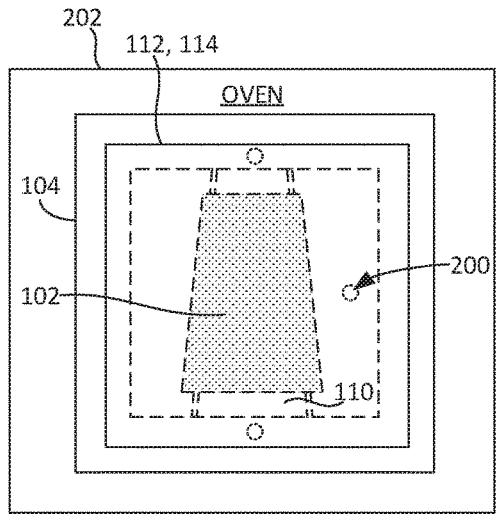
Figure 3B:
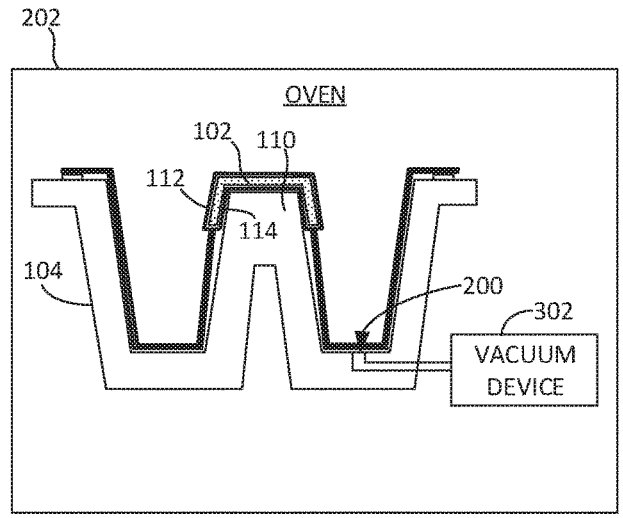
Figure 2C:
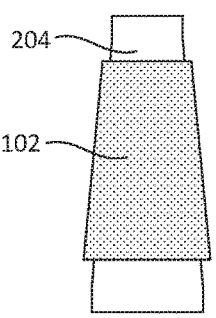
Figure 3C:
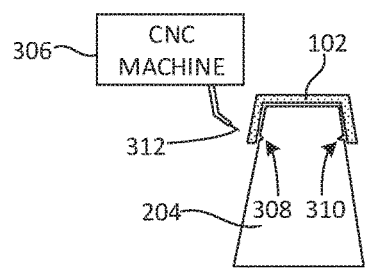

FIGS. 2A-2C and FIGS. 3A-3C show a known composite part manufacturing process using the system 100 of FIG. 1. FIGS. 2A-2C are top views at different phases during the manufacturing process and FIGS. 3A-3C are cross-sectional views corresponding respectively to the views in FIGS. 2A-2C. The cross-sectional views are taken about midway through the tool housing 104.

FIGS. 2A and 3A show the beginning of the forming phase. The preform 102 is disposed between the upper and lower diaphragms 112, 114. The preform 102 is shown in stippling to distinguish the preform 102 from the other parts. The upper and lower diaphragms 112, 114, along with the preform 102, are lowered onto the upper perimeter surface 108 of tool housing 104. The sealant 124 (FIG. 3A) forms a seal between the upper perimeter surface 108 of the tool housing 104 and the lower diaphragm 114. As a result, a sealed chamber 300 (FIG. 3A) is formed by the cavity 106 between the tool housing 104 and the lower diaphragm 114. As mentioned above, when the lower diaphragm 114 is disposed on the upper perimeter surface 108, the inlet opening 120 (FIG. 2A) aligns with the resin inlet port 116 (FIG. 2A) and the outlet opening 122 (FIG. 2A) aligns with the resin outlet port 118 (FIG. 2A).

To keep the upper and lower diaphragms 112, 114 suctioned together, a vacuum is applied at the resin outlet port 118, which suctions the upper and lower diaphragms 112, 114 together, thereby sandwiching the preform 102 between the upper and lower diaphragms 112, 114. As such, the upper and lower diaphragms 112, 114 and the preform 102 act as a single piece of flexible material. Additionally, resin is supplied to the space between the upper and lower diaphragms 112, 114 from the resin inlet port 116. The liquid resin is drawn through the preform 102 toward the resin outlet port 118. The liquid resin infuses with the fibers of the preform 102.

To shape the preform 102 into the shape of the mold 110, a vacuum is created in the chamber 300 by a vacuum device 302 (FIG. 3A). As shown in FIGS. 2A and 3A, a vacuum port 200 is formed in a bottom surface 304 (FIG. 3A) of the tool housing 104. The vacuum port 200 is fluidly coupled to the vacuum device 302. The vacuum device 302 evacuates the air within the chamber 300. As a result, the upper and lower diaphragms 112, 114, along with the preform 102 sandwiched therebetween, are pulled into the cavity 106 and the preform 102 conforms to the shape of the mold 110.

After the forming phase, the entire tool housing 104, along with the upper and lower diaphragms 112, 114 and the preform 102, is transferred into an oven 202 for curing as shown in FIGS. 2B and 3B. The oven 202 heats the preform 102 to cure the liquid resin. The vacuum device 302 continues to apply a vacuum at the vacuum port 200 to keep the preform 102 suctioned against the mold 110. Further, in some instances, resin infusion continues to occur while the preform 102 is in the oven, but prior to curing. During curing, the preform 102 hardens into the shape of the mold 110.

After curing, the tool housing 104 is removed from the oven 202. The upper and lower diaphragms 112, 114 are removed from the tool housing 104 and the hardened preform 102 is separated from the upper and lower diaphragms 112, 114.

Then, as shown in FIGS. 2C and 3C, the hardened preform 102 is placed on a trim tool 204 for trimming during a trimming phase. The trim tool 204 has the same shape as the mold 110 to support the hardened preform 102 while trimming. A trimming tool, such as a computer numerical control (CNC) machine 306, trims one or more edges of the hardened preform 102. As shown in FIG. 3C, the trim tool 204 includes first and second trimming grooves 308, 310, which are used to accommodate a router bit 312 of the CNC machine 306 while trimming the edges of the preform.

While the known process described above is effective for forming a composite part, there are many drawbacks of this process. For instance, the tool housing 104 is relatively expensive to manufacture due to the size and amount of material needed. As mentioned above, the tool housing 104 needs to be constructed of a material that can withstand (and not deteriorate from) the temperature changes during the curing process in the oven. With larger tool housings, the volume of this material can become quite large and, thus, the tool housing becomes expensive to manufacture.

Further, the tool housing 104 consumes a large amount of space in the oven 202 compared to the size of the preform 102. It may be desired to cure multiple preform parts on multiple tool housings in the oven 202 at the same time. However, space may be limited due to the size of the tool housings. Also, moving the entire tool housing 104, which may be constructed of stainless steel, becomes a difficult process because of the size and weight of the tool housing 104. Large hoists and other machines are needed to maneuver the tool housing 104. Further, after curing the preform 102, the hardened preform 102 needs to be transferred to a separate trim tool 204. Thus, a separate transportation process is needed and a separate tool is needed in addition to the tool housing 104 to complete the manufacturing process.

Example apparatus, systems, and method are disclosed herein that address the above-noted drawbacks. Examples disclosed herein utilize modular tool inserts that can be used during multiple phases of a composite part manufacturing process. An example modular tool insert couples to a docking station to form a tool housing. The modular tool insert includes a mold around which the preform is to be shaped. The tool housing, formed by the docking station and the modular tool insert, can be used for forming the perform and for resin infusion. After the initial forming process, the modular tool insert, along with a diaphragm assembly (including one or more diaphragms) and the preform, is disconnected from the docking station and transferred to the oven for curing. As such, only a portion of the tool housing is to be constructed of a stronger material for withstanding the curing process. The docking station, which is not transferred to the oven, can be constructed of a cheaper, lighter material that does not need to withstand the temperature changes in the oven. Thus, less material and less machining can be used to create the docking station portion of the tool housing, thereby lowering costs of the manufacturing process. Further, eliminating the larger volume of the tool housing material that is typically disposed in the oven reduces load on the oven to heat the preform to the proper temperatures. Also, moving the modular tool insert, as opposed to the entire tool housing, is easier and can be performed with smaller, less powerful equipment.

The example modular tool inserts also consume significantly less space in the oven than the entire tool housing 104 of the known system 100. As such, more parts can be cured in the oven at the same time, thereby increasing production throughput. Further, after curing, the hardened preform can be trimmed directly on the mold of the modular tool insert. In some examples, one or more trimming grooves are formed directly on the mold of the modular tool insert. Thus, use of the modular tool insert results in fewer tools needed to manufacture the part as compared to the known system.

Figure 4:
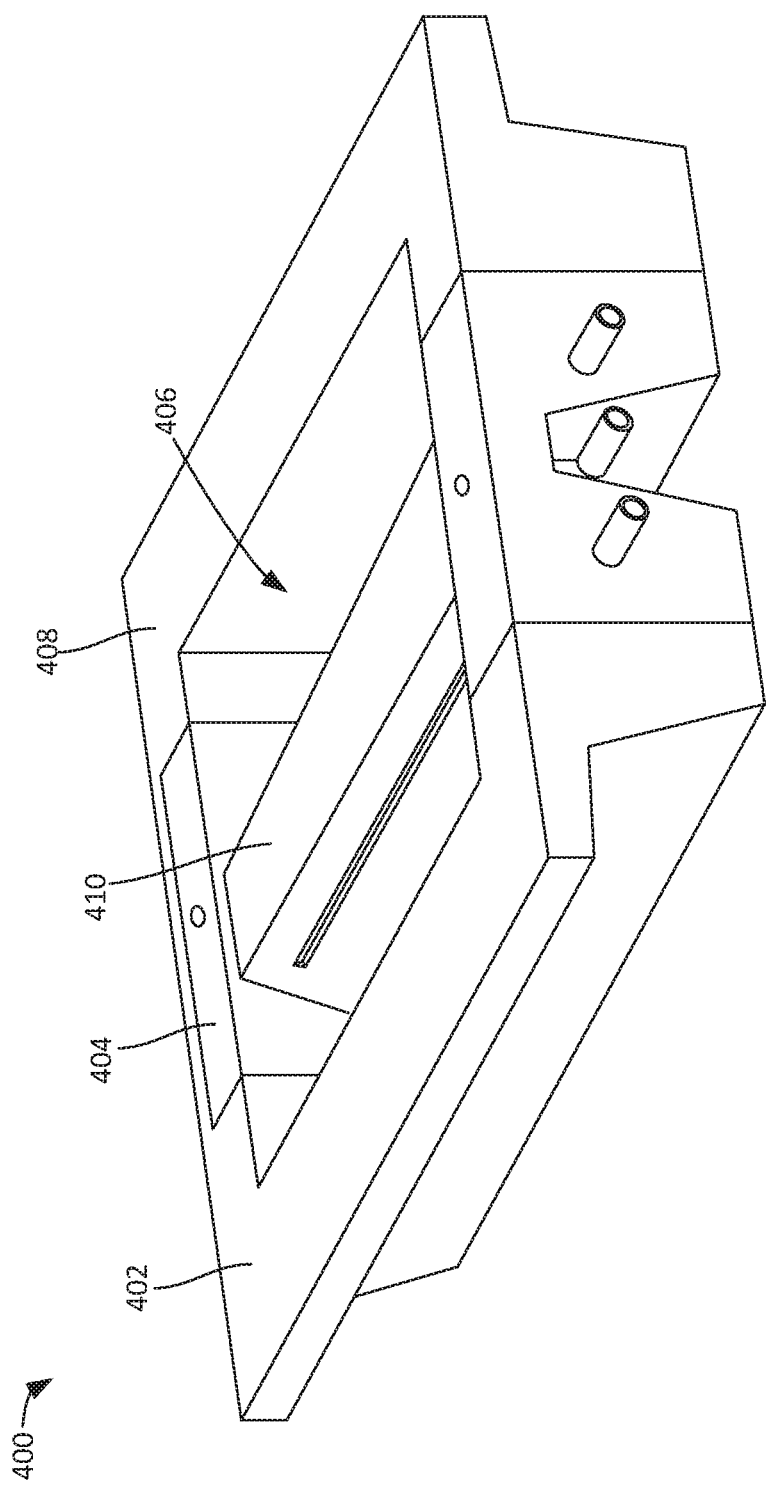
FIG. 4 is a perspective view of an example tool housing formed by an example docking station and an example modular tool insert constructed in accordance with the teachings of this disclosure.

FIG. 4 is a perspective view of an example tool housing 400 (which may be referred to as a forming tub) formed by an example docking station 402 and an example modular tool insert 404 constructed in accordance with the teachings of this disclosure. The modular tool insert 404 is removably coupled to the docking station 402. In particular, the modular tool insert 404 may be inserted into (e.g., plugged into, interlocked with, etc.) the docking station 402 to form the tool housing 400. Similar to the tool housing 104 of FIG. 1, the tool housing 400 can be used during a forming phase in a composite part manufacturing process, as disclosed in further detail herein. Further, the modular tool insert 404 can be removed from the docking station 402 and used in one or more other phases of the process without the docking station 402. The example tool housing 400 can be used with processes that include liquid resin infusion or processes that do not, such as pre-impregnated carbon fabric or wet layup processes. Also, the example tool housing 400 can be used with a double diaphragm assembly or a single diaphragm assembly.

As shown in FIG. 4, when the modular tool insert 404 is inserted into the docking station 402, the tool housing 400 defines a cavity 406. The tool housing 400 has an upper perimeter surface 408 formed by portions of the docking station 402 and the modular tool insert 404. The modular tool insert 404 includes a mold 410 (e.g., a mandrel) that may be used to shape a preform during a manufacturing process. When the modular tool insert 404 is inserted into the docking station 402, the mold 410 is disposed in the cavity 406. The top and/or side surfaces of the mold 410 may be considered critical mold surfaces around which a preform is shaped. In the illustrated example, the mold 410 has a trapezoidal shape. However, in other examples, the mold 410 may be shaped differently. In particular, the mold 410 can have other cross-sectional shapes and/or contours to form the desired part shape.

Figure 5:
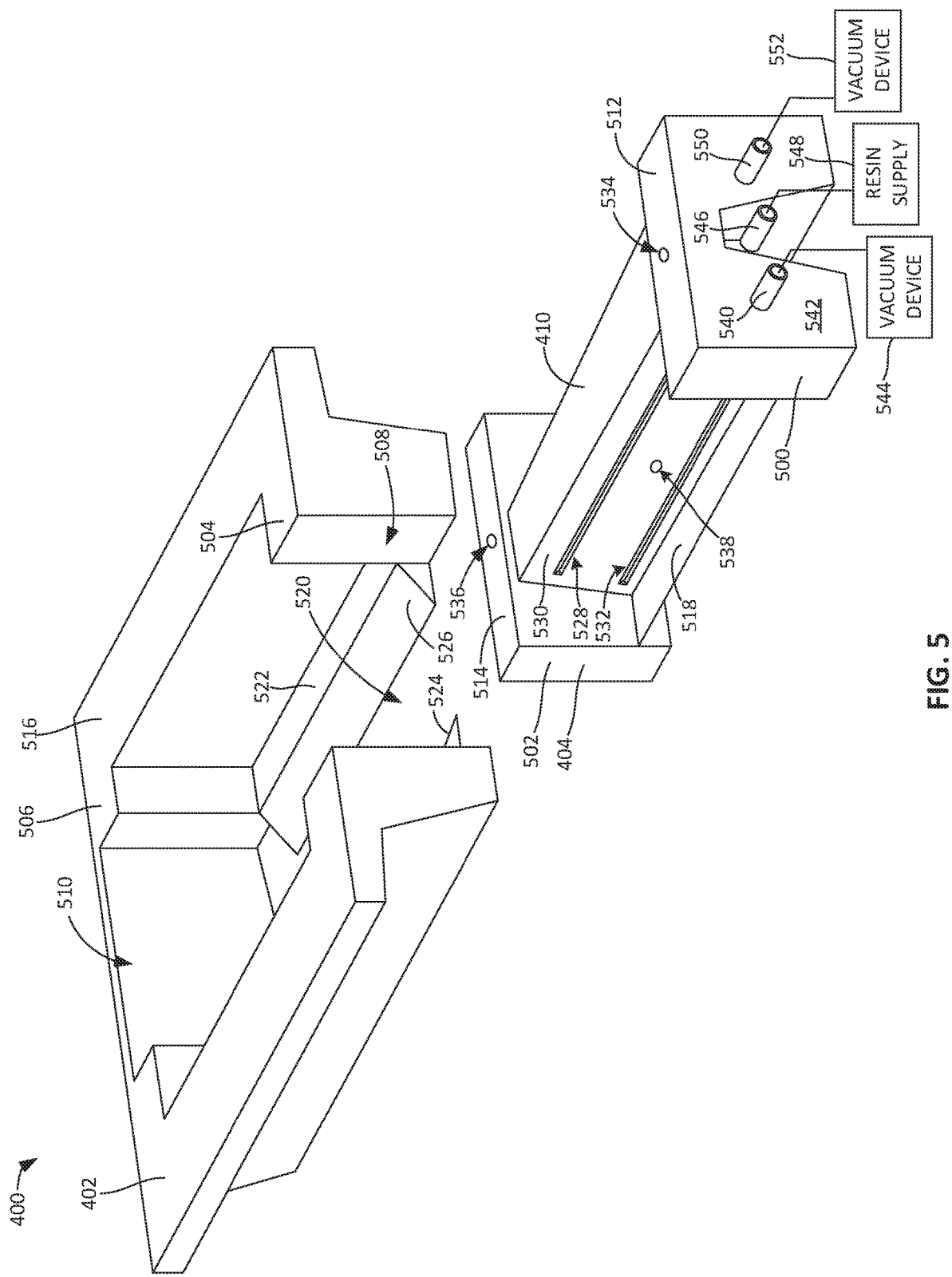
FIG. 5 is an exploded view of the example tool housing of FIG. 4.

FIG. 5 is an exploded view of the tool housing 400 showing the modular tool insert 404 separated from the docking station 402. The modular tool insert 404 includes one or more portions (e.g., connectors) that mate with other portions of the docking station 402 to form the tool housing 400. For example, as shown in FIG. 5, the modular tool insert 404 includes a first end block 500 and a second end block 502, which form opposite ends of the modular tool insert 404. In the illustrated example, the mold 410 is coupled between and extends between the first end block 500 and the second end block 502. The first and second end blocks 500, 502 are shaped to be received by (e.g., fit in, plug into, interlock with) the docking station 402. For example, the docking station 402 has a first end wall 504 and a second end wall 506 opposite the first end wall 504. The first end wall 504 includes an opening 508 to receive the first end block 500, and the second end wall 506 includes a notch 510 sized to receive the second end block 502.

The first end block 500 has a first top surface 512 and the second end block 502 has a second top surface 514. When the modular tool insert 404 is inserted into the docking station 402 (as shown in FIG. 4), the first and second top surfaces 512, 514 are substantially even or flush with a top surface 516 of the docking station 402. The first and second top surfaces 512, 514 of the first and second end blocks 500, 502 and the top surface 516 of the docking station 402 form the upper perimeter surface 408 (FIG. 4) of the tool housing 400.

In the illustrated example of FIG. 5, the modular tool insert 404 includes a bottom wall 518. The bottom wall 518 extends between first and second end blocks 500, 502. The mold 410 extends upward from the bottom wall 518. The bottom wall 518 of the modular tool insert 404 fits within an opening 520 (e.g., a slot) formed in a bottom wall 522 of the docking station 402. In some examples, the bottom walls 518, 522 are angled or chamfered (with respect to the upward facing surfaces of the bottom walls 518, 522) to improve the sealing interface therebetween. For example, the bottom wall 522 of the docking station 402 includes a first angled surface 524 and a second angled surface 526 that interface with corresponding surfaces on the bottom of the bottom wall 518 of the modular tool insert 404, as shown in more detail in connection with FIG. 11A.

Figure 6:
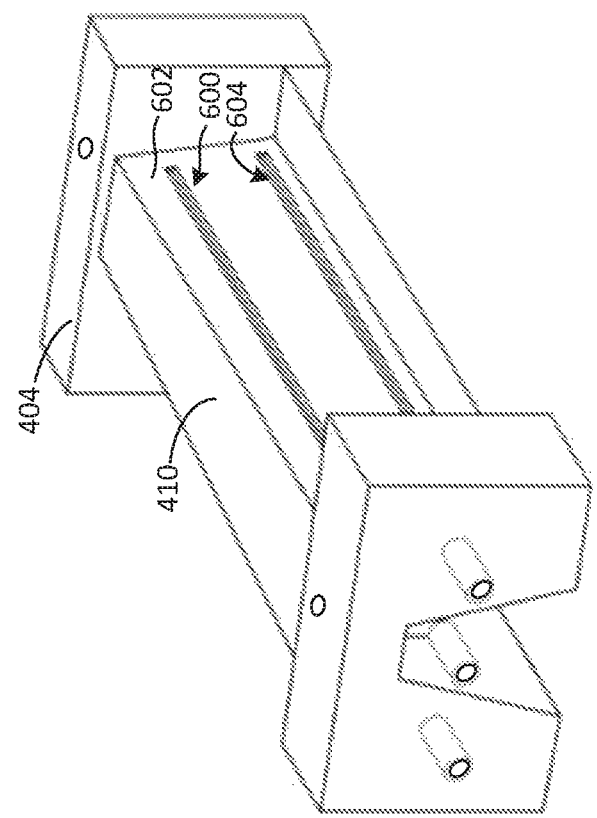
FIG. 6 is an isolated perspective view of the example modular tool insert of FIG. 4.

In some examples, the modular tool insert 404 includes one or more trimming grooves used during the trimming phase of the manufacturing process. For example, as shown in FIG. 5, a first trimming groove 528 is formed in a first side 530 of the mold 410. Further, as shown in FIG. 6, a second trimming groove 600 is formed in a second side 602 of the mold 410. The first and second trimming grooves 528, 600 may be used when performing a trimming operation on a part, as disclosed in further detail herein. Additionally or alternatively, one or more other trimming grooves may be formed in other surfaces (e.g., on the insides of the first and second end blocks 500, 502, on the bottom wall 518, etc.) of the modular tool insert 404 depending on the desired trimming operations to be performed.

In some examples, the modular tool insert 404 includes one or more diaphragm cutting grooves. For example, as shown in FIG. 5, a first diaphragm cutting groove 532 is formed in the first side 530 of the mold 410. Further, as shown in FIG. 6, a second diaphragm cutting groove 604 is formed in the second side 602 of the mold 410. The first and second diaphragm cutting grooves 532, 604 may be used when removing excess portions of upper and/or lower diaphragms, as disclosed in further detail herein.

Referring back to FIG. 5, the modular tool insert 404 of the illustrated example includes a resin inlet port 534 and a resin outlet port 536 for resin infusion. The resin inlet port 534 is to supply liquid resin and the resin outlet port 536 creates a vacuum that draws the liquid resin in the direction of the resin outlet port 536. In some examples, a portion of the liquid resin is drawn into the resin outlet port 536. In the illustrated example, the resin inlet port 534 is formed in the first end block 500 and the resin outlet port 536 is formed in the second end block 502. In particular, the resin inlet port 534 is formed on the first top surface 512 of the first end block 500, and the resin outlet port 536 is formed on the second top surface 514 of the second end block 502. In other examples, the locations of the resin inlet port 534 and the resin outlet port 536 may be reversed. In other examples, the resin inlet port 534 and/or the resin outlet port 536 may be disposed on other surfaces of the modular tool insert 404. Further, in some examples, such as for single diaphragm processes, the modular tool insert 404 may include one or more additional inlet ports and/or outlet ports, which may be provided in the same location or different locations than the resin inlet port 534 and the resin outlet port 536.

In the illustrated example, the modular tool insert 404 includes a vacuum port 538, which is used to apply a vacuum (negative pressure) beneath a diaphragm used with the example tool housing 400, as disclosed in further detail herein. In the illustrated example, the vacuum port 538 is formed in the first side 530 of the mold 410. In other examples, the vacuum port 538 may be formed in another surface of the modular tool insert 404 (e.g., on the second side 602 of the mold 410, on the first end block 500, on the bottom wall 518, etc.).

In the illustrated example, the modular tool insert 404 includes a first passageway or conduit 540 that extends at least partially through the modular tool insert 404. The first conduit 540 is connected to the vacuum port 538. The first conduit 540 extends from and/or is otherwise accessible at an outer surface 542 of the first end block 500. A first vacuum device 544 can be coupled to the first conduit 540 to apply a vacuum (negative pressure) at the vacuum port 538. The modular tool insert 404 also includes a second passageway or conduit 546 that extends at least partially through the modular tool insert 404 and is connected to the resin inlet port 534. The second conduit 546 also extends from and/or is otherwise accessible at the outer surface 542 of the first end block 500. A resin supply 548 can be coupled to the second conduit 546 to supply liquid resin to the resin inlet port 534. The modular tool insert 404 further includes a third passageway or conduit 550 that extends at least partially through the modular tool insert 404 and is connected to the resin outlet port 536. The third conduit 550 extends from and/or is otherwise accessible at the outer surface 542 of the first end block 500. A second vacuum device 552 can be coupled to the third conduit 550 to create a vacuum at the resin outlet port 536 for drawing the liquid resin during the resin infusion process.

Figure 7:
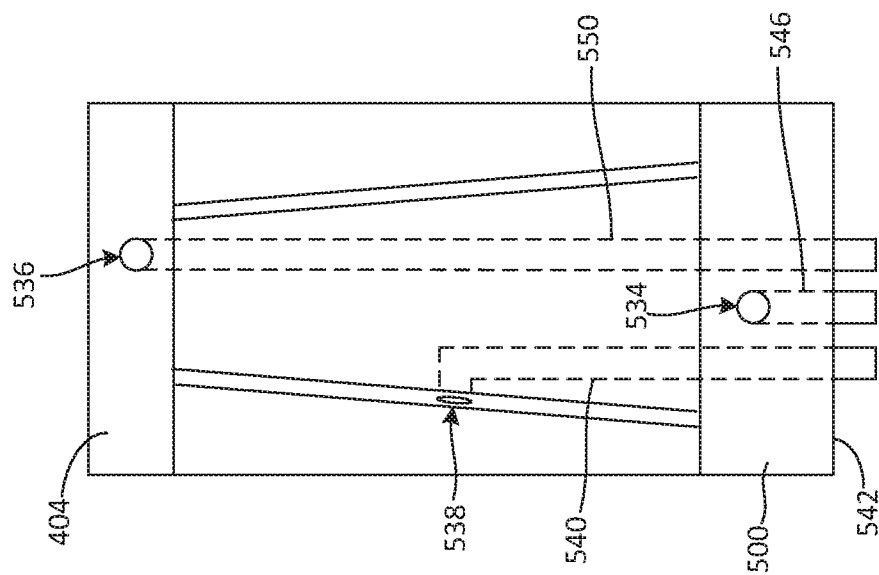
FIG. 7 is a top view of the modular tool insert of FIG. 4.

FIG. 7 is a top view of the example modular tool insert 404 showing example first, second, and third conduits 540, 546, 550 (shown in dashed lines) extending at least partially through the modular tool insert 404 to the outer surface 542 of the first end block 500. The first conduit 540 is fluidly coupled to the vacuum port 538, the second conduit 546 is fluidly coupled to the resin inlet port 534, and the third conduit 550 is fluidly coupled to the resin outlet port 536. In the illustrated example, the first, second, and third conduits 540, 546, 550 are accessible at an end of the modular tool insert 404 (e.g., at the outer surface 542 of the first end block 500). However, in other examples, the first, second, and/or third conduits 540, 546, 550 may extend from another side or surface of the modular tool insert 404.

Figure 8:
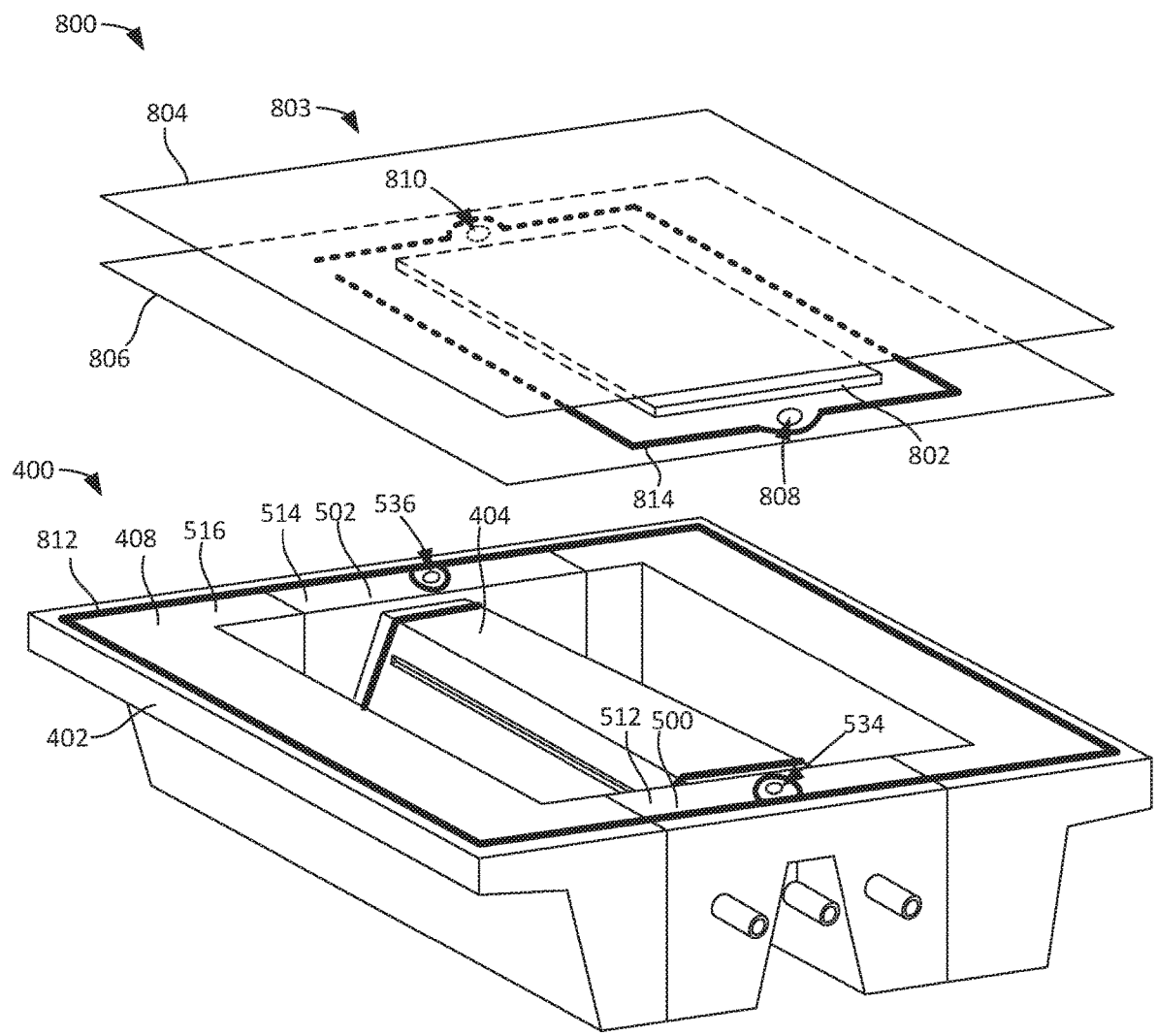
FIG. 8 shows the example tool housing of FIG. 4 as part of an example diaphragm tooling system for use in a composite part manufacturing process.

FIG. 8 shows the example tool housing 400 as part of a system 800 used in one or more phases of a manufacturing process to form a composite part from a preform 802. The final composite part may be a part for a vehicle, such as an aircraft. For example, the final composite part may be a spar, a rib, a panel or skin, a rudder, a flap, etc. In other examples, the composite part can be any other type of part for use in any industry (e.g., medial, aerospace, energy, automotive, fluids, electric, etc.). The preform 102 is constructed of one or more fibrous layers (or plies). The preform 102 may include at least one of dry carbon fabric, pre-impregnated carbon fabric, or wet laid carbon fabric. During the manufacturing process, a diaphragm assembly 803 is used to form the preform 802 onto the mold 404. The diaphragm assembly 803 may include one or more diaphragms. In this example, the diaphragm assembly 803 is implemented as a double diaphragm, which includes an upper diaphragm 804 and a lower diaphragm 806. In other examples, the diaphragm assembly 803 may include a single diaphragm, such as only the upper diaphragm 804. In the double diaphragm assembly shown in FIG. 8, the preform 802 is to be disposed between the upper diaphragm 804 and the lower diaphragm 806. Similar to the upper and lower diaphragms 112, 114 described above in connection with FIG. 1, the upper and lower diaphragms 804, 806 are constructed of thin, flexible material, such as nylon, silicone, or polypropylene. In some examples, the edges of the upper and lower diaphragms 112, 114 are connected (e.g., via a seal or adhesive), such that the upper and lower diaphragms 804, 806 form a bag around the preform 802. In other examples, the upper and lower diaphragms 804, 806 may be formed from a single piece of material to form a bag in which the preform 802 is disposed. The lower diaphragm 806 includes an inlet opening 808 and an outlet opening 810 that align with the resin inlet port 534 and the resin outlet port 536, respectively, when the lower diaphragm 806 is disposed on the tool housing 400, as disclosed in further detail herein.

During the forming process, the lower diaphragm 806 is to be sealed to the tool housing 400. As shown in FIG. 8, a primary sealant 812 is disposed around the upper perimeter surface 408 of the tool housing 400, which is formed by the top surface 516 of the docking station 402 and the first and second top surfaces 512, 514 of the first and second end blocks 500, 502 of the modular tool insert 404. The primary sealant 812 may be, for example, a mastic adhesive. In other examples, other types of sealants may be used, such as tape (e.g., double-sided tape). When the lower diaphragm 806 contacts the primary sealant 812, a sealed chamber is formed by the cavity 406 between the lower diaphragm 806 and the tool housing 400. The primary sealant 812 also encircles the resin inlet and outlet ports 534, 536.

Figure 9A:
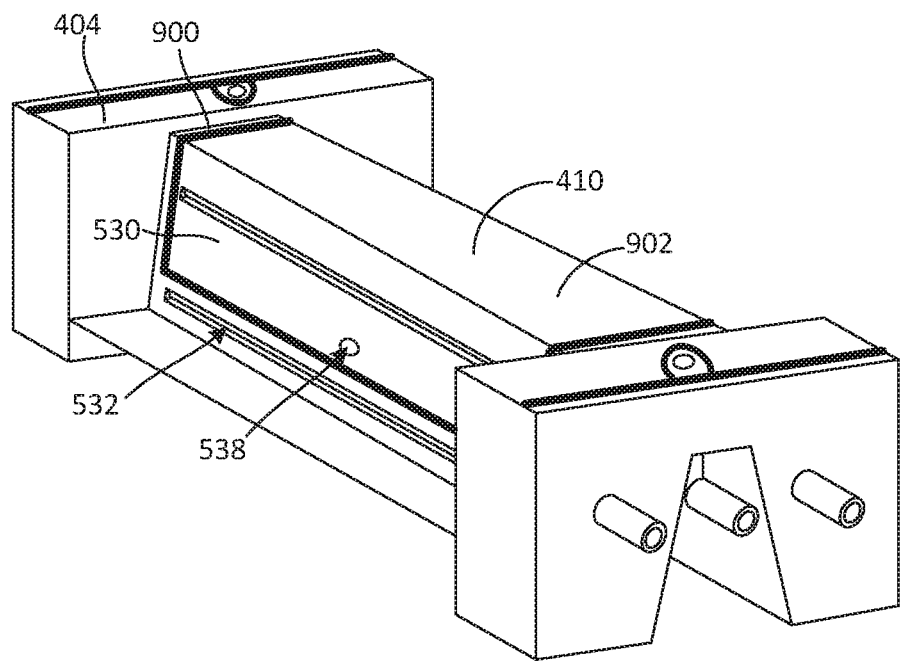
FIGS. 9A and 9B are isolated perspective views of the example modular tool insert of FIG. 8 showing the example sealants.
Figure 9B:
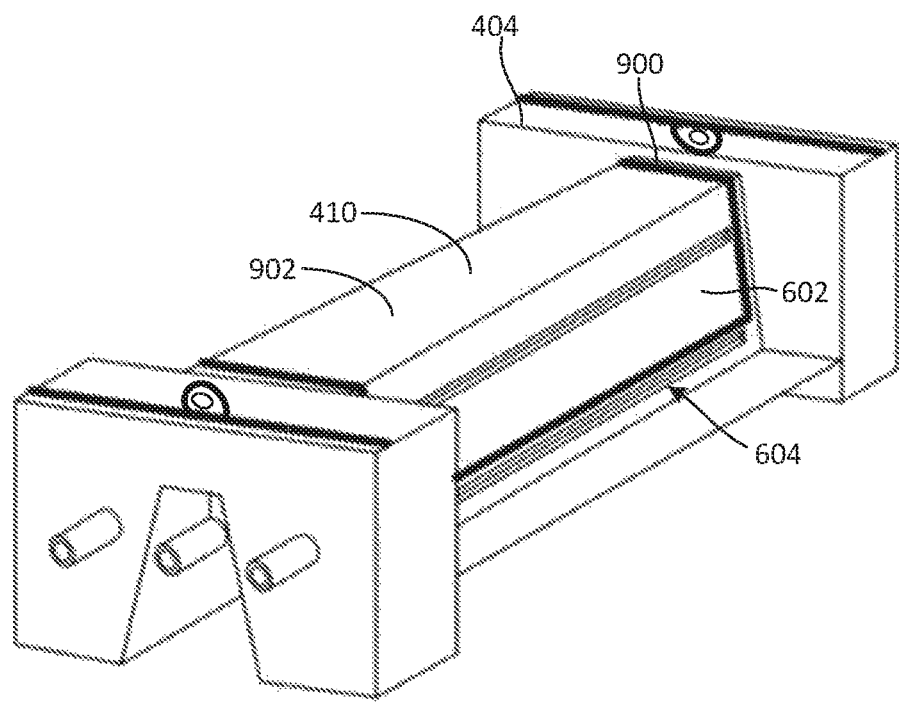

In some examples, a secondary sealant is used during the manufacturing process. FIGS. 9A and 9B show isolated perspective views of the modular tool insert 404. As shown in FIGS. 9A and 9B, a secondary sealant 900 is disposed on the modular tool insert 404. The secondary sealant 900 may be, for example, a mastic adhesive. In other examples, other types of sealants may be used, such as tape (e.g., double-sided tape). In the illustrated example, the secondary sealant 900 is disposed along the first and second sides 530, 602 of the mold 410 and over a top side 902 of the mold 410. The secondary sealant 900 forms a complete or continuous path that bounds an area of the mold 410. In the illustrated example, the vacuum port 538 is disposed on the mold 410 within the area bounded by the secondary sealant 900. The first and second diaphragm cutting grooves 532, 604 are disposed outside of the area bounded the secondary sealant 900.

Referring back to FIG. 8, a diaphragm sealant 814 is to be disposed between the upper and lower diaphragms 804, 806. In the illustrated example, the diaphragm sealant 814 surrounds the preform 802 and the inlet and outlet openings 808, 810. When the upper and lower diaphragms 804, 806 are sandwiched together, the diaphragm sealant 814 forms a sealed cavity between the upper and lower diaphragms 804, 806 around the preform 802. This sealed cavity prevents the air and/or liquid resin from escaping after removing outer portions of the upper and lower diaphragms 804, 806, as disclosed in further detail herein.

FIGS. 10A-10F and FIGS. 11A-11F show an example manufacturing process that may be performed using the modular tool insert 404 and a double diaphragm assembly. FIGS. 10A-10F are top views of the modular tool insert 404 during different phases of the manufacturing process and FIGS. 11A-11F are cross-sectional views of the modular tool insert 404 corresponding to the views in FIGS. 10A-10F. The cross-sectional views are taken along a plane that intersects the vacuum port 538 (e.g., about midway between the ends of the modular tool insert 404).

FIGS. 10A and 11A show the beginning of the forming phase, sometimes referred to as layup. The modular tool insert 404 is coupled to (e.g., inserted into) the docking station 402 to form the tool housing 400. As shown in FIG. 11A, the bottom wall 518 of the modular tool insert 404 has a first angled surface 1100 that interfaces with the first angled surface 524 of the docking station 402 and a second angled surface 1102 that interfaces with the second angled surface 526 of the docking station 402. In some examples, using angled surfaces provides a tighter fit and produces a better seal, which is advantageous when creating a vacuum in the tool housing 400. In other examples, these interface surfaces may be substantially vertical. In some examples, one or more seals are disposed between the interface surfaces. For example, as illustrated in FIG. 11A, a first seal 1104 is disposed between the first angled surfaces 1100, 524 and a second seal 1106 is disposed between the second angled surfaces 1102, 526. Seals may also be used between other surfaces of the modular tool insert 404 and the docking station 402 (e.g., between the first and second end blocks 500, 502 (FIG. 5) and the docking station 402). In other examples, no seals may be used.

The preform 802 is shown in stippling to distinguish the preform 802 from the other parts. The diaphragm assembly 803 (including the upper and lower diaphragms 804, 806), along with the preform 802, are disposed above the tool housing 400 and then lowered onto the tool housing 400. The lower diaphragm 806 of the diaphragm assembly 803 engages the primary sealant 812 on the upper perimeter surface 408. The primary sealant 812 (FIG. 11A) forms a seal between the upper perimeter surface 408 of the tool housing 400 and the lower diaphragm 806. As a result, a sealed chamber 1108 (FIG. 11A) is formed by the cavity 406 between the tool housing 400 and the lower diaphragm 806. As shown in FIG. 10A, when the lower diaphragm 806 is disposed on the upper perimeter surface 408, the inlet opening 808 aligns with the resin inlet port 534 and the outlet opening 810 aligns with the resin outlet port 536.

To keep the upper and lower diaphragms 804, 806 suctioned together, a vacuum is applied at the resin outlet port 536 via the second vacuum device 552 (FIG. 5). Additionally or alternatively, vacuum may be applied at the resin inlet port 534 (which may be ceased prior to resin infusion). The vacuum evacuates the air between the upper and lower diaphragms 804, 806 (e.g., the air within the sealed cavity formed by the diaphragm sealant 814), thereby sandwiching the preform 802 between the upper and lower diaphragms 804, 806. As such, the upper and lower diaphragms 804, 806 and the preform 802 act as a single piece of flexible material.

To shape the preform 802 into the shape of the mold 410, a vacuum is applied in the chamber 1108. The vacuum is applied at the vacuum port 538 (FIG. 11A) via the first vacuum device 544 (FIG. 5). In this example, the vacuum port 538 is on the mold 410. In other examples, the vacuum port 538 may be located on another part of the modular tool insert 404. The vacuum evacuates the air within the chamber 1108. As a result, the upper and lower diaphragms 804, 806 are stretched and pulled, along with the preform 802 sandwiched therebetween, into the cavity 406. The preform 802 is pulled onto mold 410 and conforms to the shape of the mold 410.

FIGS. 10B and 11B show the upper and lower diaphragms 804, 806, along with the preform 802, pulled into the cavity 406. The preform 802 has conformed to the shape of the mold 410. As shown in FIG. 11B, when the upper and lower diaphragms 804, 806 are pulled into the cavity 406, the lower diaphragm 806 is pulled against the inner surfaces of the cavity 406. As a result, the lower diaphragm 806 contacts the secondary sealant 900 on the modular tool insert 404. The secondary sealant 900 seals the lower diaphragm 806 to the modular tool insert 404.

In some examples, after the preform 802 is formed into the shape of the mold 410 and the lower diaphragm 806 is sealed to the modular tool insert 404, excess portions of the upper and lower diaphragms 804, 806 may be removed. In particular, the portions of the upper and lower diaphragms 804, 806 that are outside of the modular tool insert 404 can be removed. For example, as shown in FIG. 11B, a cutting tool, such as a knife 1110, may be used to cut the excess portions of the upper and lower diaphragms 804, 806. The upper and lower diaphragms 804, 806 may be cut along the first and second diaphragm cutting grooves 532, 604. The first and second diaphragm cutting grooves 532, 604 enable the knife 1110 to extend through and cut the upper and lower diaphragms 804, 806, as well as aiding in making a relatively straight cut along the mold 410. For example, the knife 1110 may be inserted into the first diaphragm cutting groove 532 and slid from one end to the other end, thereby cutting away excess portions of the upper and lower diaphragms 804, 806 that are covering the docking station 402. Because the vacuum port 538 is disposed within the boundary of the secondary sealant 900, the vacuum can continue to suction the lower diaphragm 806 and, thus, the upper diaphragm 804 and the preform 802 against the mold 410. Further, the diaphragm sealant 814 maintains a sealed cavity between the upper and lower diaphragms 804, 806 after the excess portions are removed.

Figure 10C:
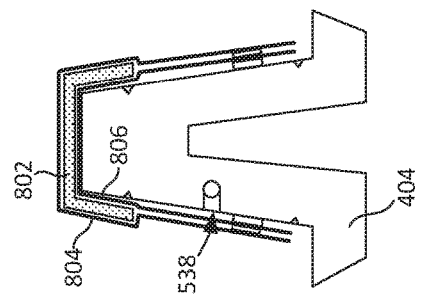
Figure 11C:
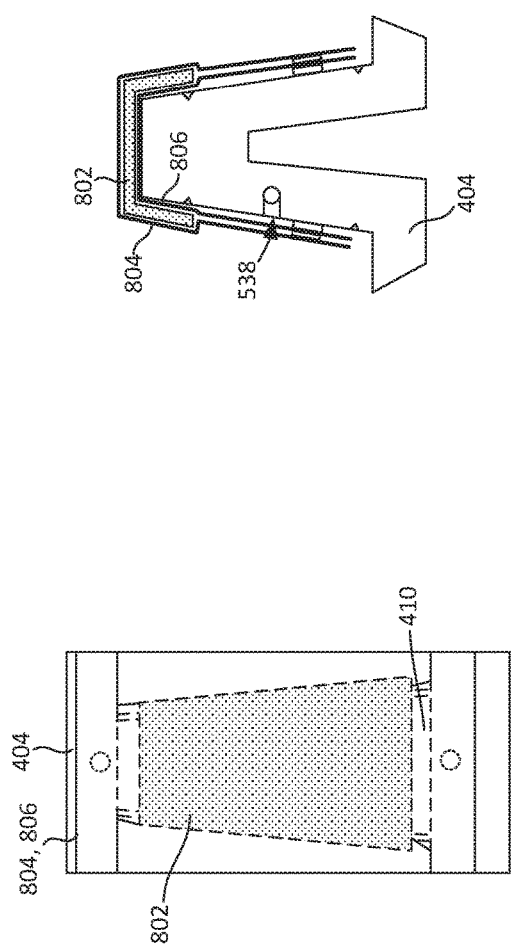

After removing the excess portions of the upper and lower diaphragms 804, 806, the modular tool insert 404, along with the upper diaphragm 804, the lower diaphragm 806, and the preform 802, are removed from the docking station 402, as shown in FIGS. 10C and 11C. The first vacuum device 544 (FIG. 5) continues to apply a vacuum at the vacuum port 538 (FIG. 11B), which is beneath the lower diaphragm 806 and maintains keep the lower diaphragm 806 (and, thus, the preform 802) suctioned to the mold 410.

In some examples, after the preform 802 is shaped over the mold 404, resin infusion is performed. In such an example, liquid resin is supplied to the resin inlet port 534 by the resin supply 548 (FIG. 5). The liquid resin is drawn through the inlet opening 808 and into the space between the upper and lower diaphragms 804, 806. The vacuum applied at the resin outlet port 536 draws the liquid resin through the preform 802 and toward the resin outlet port 536. The liquid resin infuses into the fibers of the preform 802. The resin infusion process may occur before the modular tool insert 404 is removed from the docking station 402, after the module tool inert 404 is removed from the docking station 402, and/or while the modular tool insert 404 is disposed in an oven prior to curing.

Figure 10D:
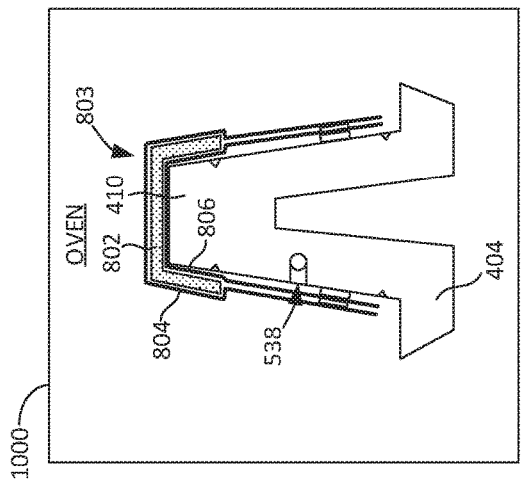
Figure 11D:
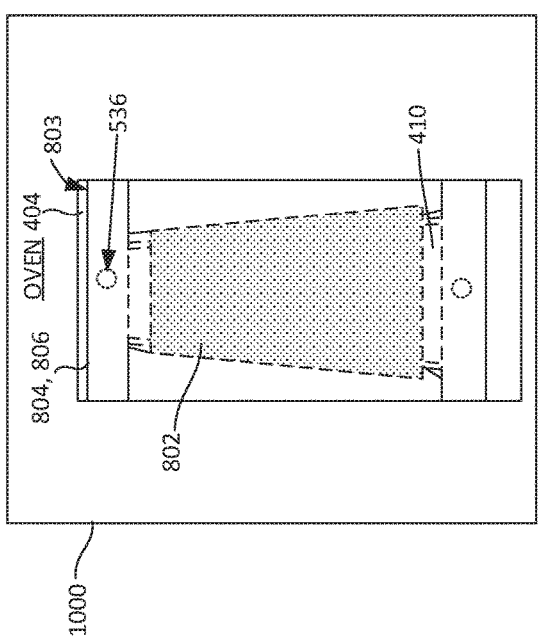

As shown in FIGS. 10D and 11D, the modular tool insert 404, along with the upper diaphragm 804, the lower diaphragm 806, and the preform 802, are then placed into an oven 1000 for curing, without the docking station 402. In some examples, the modular tool insert 404 is transferred from the docking station 402 (FIGS. 10A, 10B, 11A, 11B) by hand (if the modular tool insert 404 is relatively light). In other examples, the modular tool insert 404 may be transferred on a movable device such as a cart and/or a hoist.

During the curing phase, the first vacuum device 544 (FIG. 5) may continue to apply a vacuum at the vacuum port 538 to maintain the diaphragm assembly 803 (and, thus, the preform 802) suctioned to the mold 410. In some examples, during curing, the second vacuum device 552 (FIG. 5) continues to apply a vacuum at the resin outlet port 536 to suction the upper and lower diaphragms 804, 806 together. The curing phase causes the preform 802, with the resin, to set and/or otherwise harden in its current shape. Thus, the hardened preform 802 maintains the shape of the mold 410.

Figure 11E:
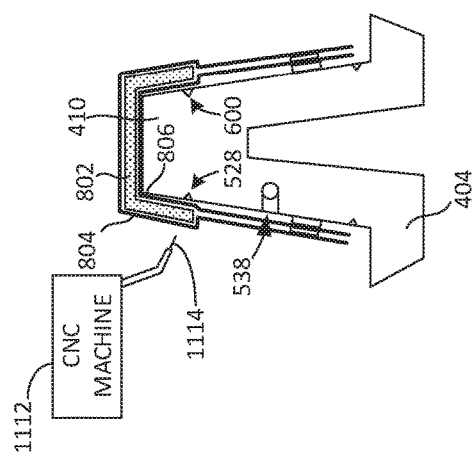
Figure 10E:
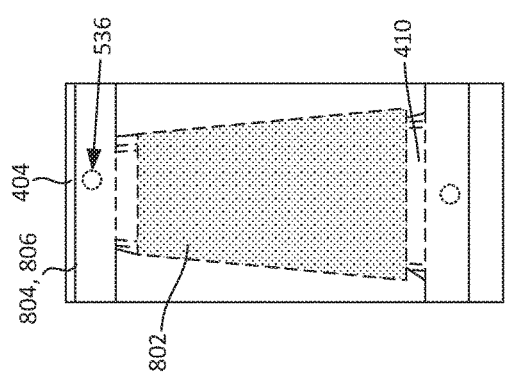

FIGS. 10E and 11E show the modular tool insert 404 after being removed from the oven 1000 (FIGS. 10D and 11D). As mentioned above, the preform 802 is rigid and maintains its shape. The vacuum applied at the vacuum port 538 is deactivated. Further, the vacuum applied at the resin outlet port 536 is deactivated. In some examples, the hardened preform 802 is then trimmed during a trimming phase. The hardened preform 802 may be trimmed using a device such as a CNC machine 1112, as shown in FIG. 11E. A router bit 1114 of the CNC machine 1112 can be inserted along the first and second trimming grooves 528, 600 to trim the edges of the preform 802 to the desired shape. The first and second trimming grooves 528, 600 enable the router bit 1114 to extend through and cut the hardened preform 802 without damaging the mold 410. In some examples, the upper and lower diaphragms 804, 806 are also cut by the CNC machine 1112. In other examples, other types of devices can be used to trim excess portions of the hardened preform 802.

Figure 11F:
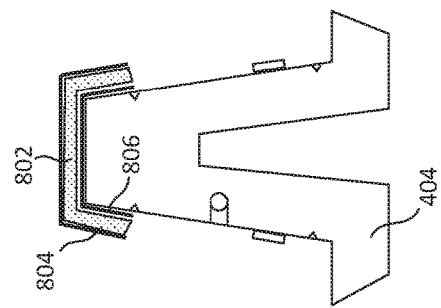
Figure 10F:
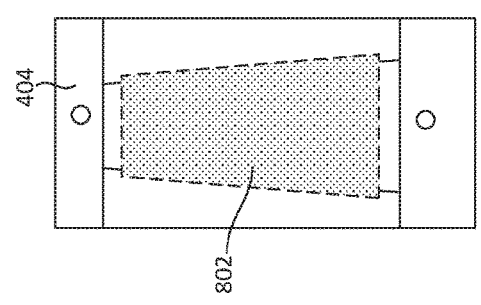

FIGS. 10F and 11F show the preform 802 after being trimmed. The preform 802 may then be removed from the modular tool insert 404 and separated from the remaining portions of the upper and lower diaphragms 804, 806. In some examples, the modular tool insert 404 may then be used again in another composite part manufacturing process.

As can be appreciated from the example process disclosed above, using the modular tool insert 404 reduces the amount of space needed in the oven 1000 for curing the preform 802 compared to the known process, which requires the entire tool housing to be disposed in the oven while curing. As such, more parts can be cured in the oven 1000 simultaneously, thereby enabling higher production rates. Further, because only the modular tool insert 404 is used in the oven 1000, the docking station 402 can be made of a lower cost material that does not need to withstand any such temperature changes. This reduces the overall costs of the tooling needed for manufacturing the composite part. Also, using less tooling material in the oven 1000 reduces the load on the oven 1000 to reach and maintain the desired temperatures. Moreover, after curing, the preform 802 does not need to be removed from the mold 410 and disposed on a separating trimming part as required in the known process described in FIGS. 2C and 3C. Instead, the preform 802 can remain on the modular tool insert 404 during the trimming phase. This reduces manufacturing time and reduces the number of tools required to complete the manufacturing process, thereby enabling higher throughput.

While the example process of FIGS. 10A-10F and 11A-11F generally includes a forming phase, a resin infusion phase, a curing phase, and a trimming phase, in other examples, one or more of the phases may not be performed. For example, some manufacturing processes may not require an oven for curing. Instead, the preform 802 along with the resin may cure under ambient temperatures. Additionally or alternatively, other types of operations (e.g., cooling, painting, drilling, etc.) may be performed during the manufacturing process to complete the final composite part.

In some examples, the docking station 402 can be used with other modular tool inserts. For example, other modular tool inserts having similar end blocks may be coupled to the docking station 402 used in a similar manner during the forming phase. The other modular tool inserts may have the same or differently shaped molds. Therefore, while one modular tool insert is curing in the oven or being used for trimming, another modular tool insert may be connected to the docking station 402 and used for the initial forming. As such, the modular tool inserts are interchangeable with the docking station 402.

While in the example process shown in FIGS. 10A-10F and 11A-11F the example modular tool insert 404 is used in connection with a double diaphragm assembly, the modular tool insert 404 can be similarly used in connection with a single diaphragm assembly. For example, some processes, such as a pre-impregnated carbon fabric process (sometimes referred to as prepreg) or a wet layup process, do not utilize a resin infusion phase. In such examples, only one diaphragm, such as just the upper diaphragm 804, may be utilized. For example, in a pre-impregnated carbon fabric process, the preform 802 is pre-impregnated with resin. In other words, resin is already present in the preform 802. In this type of process, the preform 802 is disposed directly over the mold 410 on the modular tool insert 404 (without a diaphragm between the preform 802 and the mold 410). Then, a single diaphragm, such as just the upper diaphragm 804, is lowered onto the tool housing 400 and sealed to the tool housing 400 by the primary sealant 812 to form the seal chamber 1108. Then, when the vacuum is applied via the vacuum port 538, the upper diaphragm 804 is suctioned into the cavity 406, which pulls the preform 802 over the mold 410 such that the preform 802 conforms to the shape of the mold 410. The upper diaphragm 804 is pulled against the secondary sealant 900 on the modular tool insert 404. Then, any of the subsequent phases and/or operations disclosed above may be similarly performed. For example, excess portions of the upper diaphragm 804 may be removed, the modular tool insert 404, along with the upper diaphragm 804 and the preform 802, may be removed from the docking station 802, the preform 802 may be cured in an oven, and/or the preform 802 may be trimmed on the modular tool insert 404. In some examples, the resin inlet port 534 and/or the resin outlet port 536 may be used to apply a vacuum beneath the upper diaphragm 804. The resin inlet port 534 and/or the resin outlet port 536 may be connected to the preform 802 via breather material.

Similar to the pre-impregnated carbon fabric process disclosed above, in a wet layup process, only a single diaphragm may be used. In a wet layup process, a dry carbon fabric layer is disposed directly over the mold 410 on the modular tool insert 404 and then liquid resin is applied to (e.g., rolled onto) the dry carbon fabric layer followed by another layer of carbon fabric. These layers of carbon fabric and resin form the preform 802. Then, a single diaphragm, such as just the upper diaphragm 804, is lowered onto the tool housing 400 and sealed by the primary sealant 812 to form the sealed cavity 1108. Then, similar to the pre-impregnated carbon fabric process disclosed above, any of the subsequent phases and/or operations disclosed above may be similarly performed.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

Figure 12A:
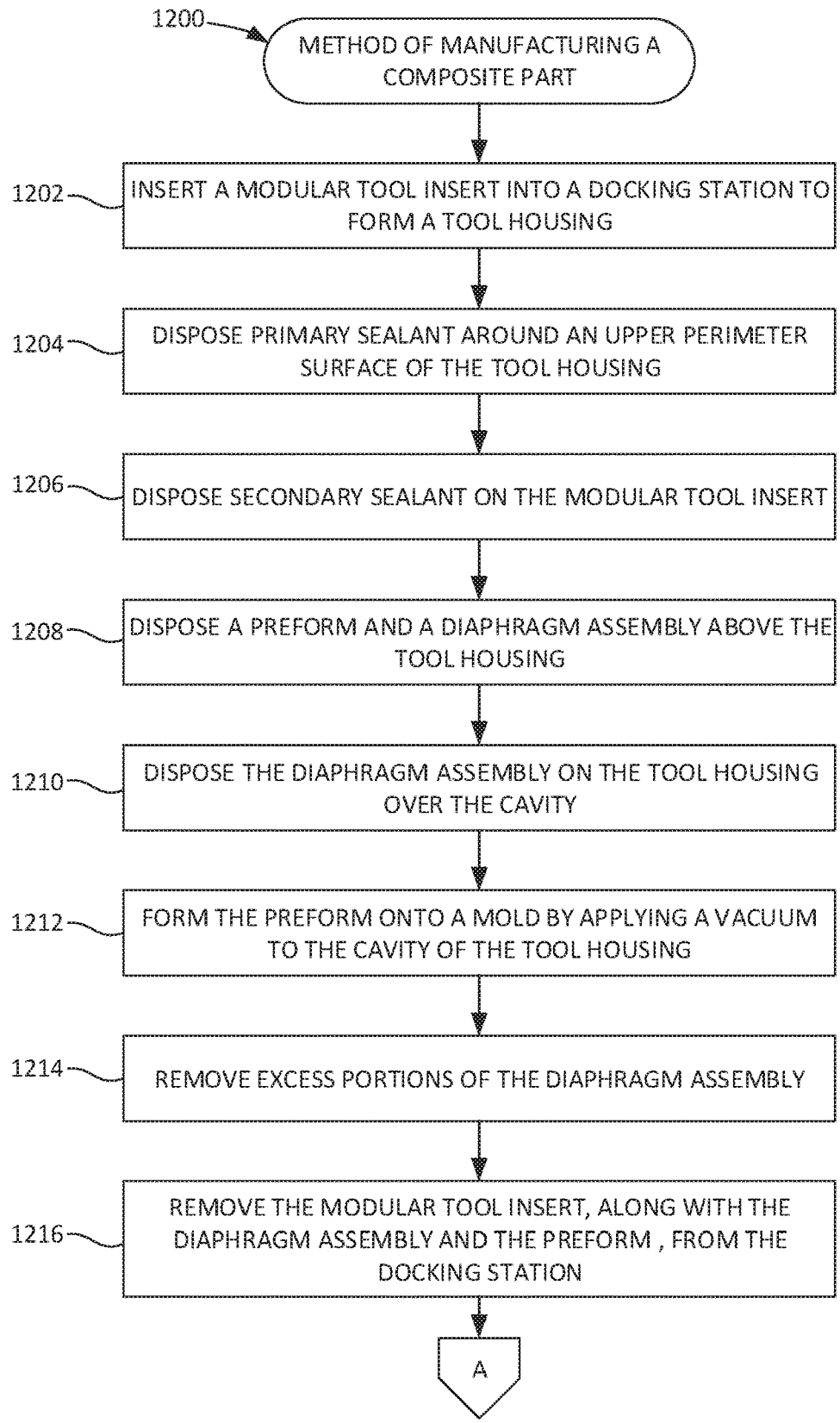
FIGS. 12A and 12B are a flowchart representative of an example method of manufacturing a composite part using the example modular tool insert of FIG. 4.
Figure 12B:
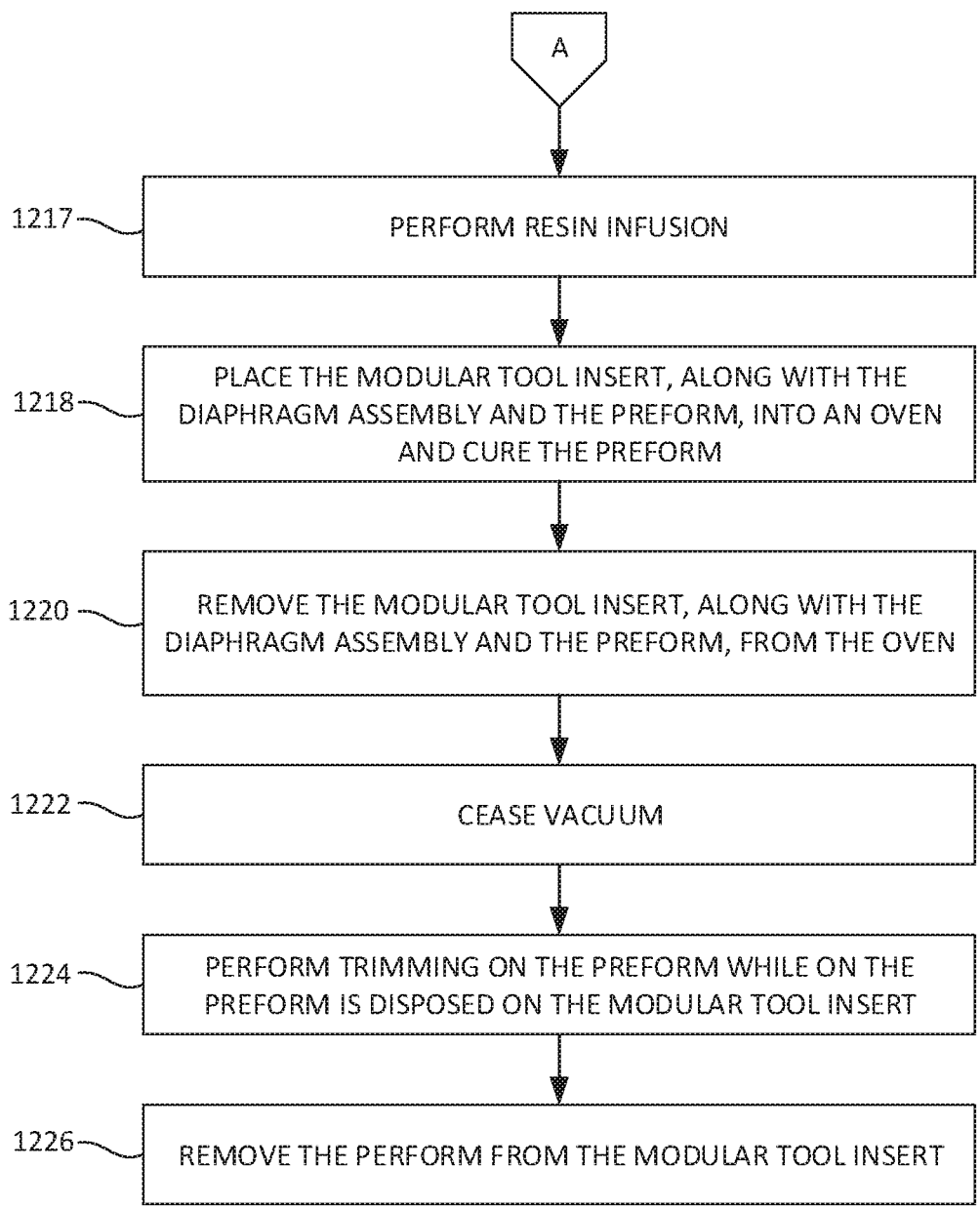

FIGS. 12A and 12B are a flowchart representative of an example method 1200 of manufacturing a composite part using a modular tool insert. The example method 1200 is described in connection with the modular tool insert 404 as shown in FIGS. 10A-10F and 11A-11F. However, the method 1200 may be similarly implemented in connection with other types and/or shapes of modular tool inserts. Any of the example operations represented by the blocks of the method 1200 may be repeated, removed, and/or rearranged.

At block 1202, the modular tool insert 404 is inserted into the docking station 402 to form the tool housing 400. For example, the modular tool insert 404 may be lowered into the docking station 402 from above, such that the first end block 500 is inserted into the opening 508 in the first end wall 504 of the docking station 402 and the second end block 502 is inserted into the notch 510 in the second end wall 506 of the docking station 402. When the modular tool insert 404 is coupled with the docking station 402, the modular tool insert 404 and the docking station 402 cooperate to form the tool housing 400, which can be used for shaping a preform, such as the preform 802. In some examples, one or more seals, such as the first and second seals 1104, 1106, are disposed between one or more surfaces of the modular tool insert 404 and/or the docking station 402 to help create a sealed structure.

At block 1204, the primary sealant 812 is disposed around the upper perimeter surface 408 of the tool housing 400. In particular, as shown in FIG. 8, the primary sealant 812 is disposed along portions of the top surface 516 of the docking station 402 and the first and second top surfaces 512, 514 of the first and second end blocks 500, 502 of the modular tool insert 404.

At block 1206, the secondary sealant 900 is disposed on the modular tool insert 404. For example, as shown in FIGS. 9A and 9B, the secondary sealant 900 is disposed on the mold 410 of the modular tool insert 404. The secondary sealant 900 forms a continuous path that encompasses an area. The vacuum port 538 is within the encompassed area.

At block 1208, the piece of preform 802 and the diaphragm assembly 803 are disposed above the tool housing 400. In a double-diaphragm process, such as shown in FIG. 8, the diaphragm assembly 803 includes the upper diaphragm 804 and the lower diaphragm 806. In such an example, the preform 802 is disposed between the upper diaphragm 804 and the lower diaphragm 806, and then the upper and lower diaphragms 804, 806 with the preform 802 are lowered onto the tool housing 400. In other examples, such as with for a pre-impregnated carbon fabric process or a wet layup process, the diaphragm assembly 803 may only include one diaphragm. In such an example, the preform 802 may be disposed (e.g., draped) directly onto the mold 410.

Then, the diaphragm assembly 803 (e.g., only the upper diaphragm 804) is placed or lowered onto the tool housing 400 over the preform 802.

At block 1210, the diaphragm assembly is disposed on the tool housing 400 (e.g., on the upper perimeter surface 408) over the cavity 406, as shown in FIGS. 10A and 11A. For example, in the double diaphragm assembly shown in FIG. 8, the lower diaphragm 806, along with the upper diaphragm 804 and the preform 802, may be lowered onto the upper perimeter surface 408 of the tool housing 400. In some examples, the diaphragm sealant 814 is disposed between the upper and lower diaphragms 804, 806. The diaphragm sealant 814 forms a sealed cavity between the upper and lower diaphragms 804, 806 in which the preform 802 is disposed. When the lower diaphragm is disposed on the tool housing 400, the lower diaphragm 806 contacts the primary sealant 812. The primary sealant 812 seals the lower diaphragm 806 to the upper perimeter surface 408 of the tool housing 400, thereby creating the sealed chamber 1108 in the cavity 406 between the lower diaphragm 806 and the tool housing 400. The inlet opening 808 in the lower diaphragm 806 is aligned with the resin inlet port 534 and the outlet opening 810 in the lower diaphragm 806 is aligned with the resin outlet port 536. In a single diaphragm assembly, the single diaphragm (e.g., the upper diaphragm 804) may be lowered onto and contact the upper perimeter surface 408 of the tool housing 400. In such an example, the single diaphragm contacts the primary sealant 812, thereby creating a sealed chamber in the cavity 406 between the diaphragm and the tool housing 400.

At block 1212, the preform 802 is formed onto the mold 410 by applying a vacuum in the cavity 406. For example, the first vacuum device 544 may be activated to apply a vacuum at the vacuum port 538, which evacuates the air in the sealed chamber 1108. As a result, the diaphragm assembly 803 and the preform 802, are pulled down into the cavity 406 and are suctioned against the inner surfaces and contours of the cavity 406. As a result, the preform 802 conforms to the shape of the mold 410, as shown in FIGS. 10B and 11B. In some examples, such as with a double diaphragm assembly, a vacuum may also be applied at the resin inlet port 534 and/or the resin inlet port 536 to suction the upper and lower diaphragms 804, 806 together. As the lower diaphragm 806 is pulled into the cavity 406, the lower diaphragm 806 contacts the secondary sealant 900 on the modular tool insert 404. The secondary sealant 900 seals the lower diaphragm 806 to the mold 410 of modular tool insert 404. The vacuum port 538 is disposed within the sealed area between the lower diaphragm 806 and the mold 410. Therefore, the first vacuum device 544 may continue to apply a vacuum at the vacuum port 538 to keep the lower diaphragm 806 (and, thus, the preform 802) suctioned against the mold 410.

In a single diaphragm assembly, the vacuum created by the vacuum port 538 pulls the upper diaphragm 804 into the cavity 806, thereby suctioning the preform 802 against the mold 410. In some examples, vacuum is also applied at the resin inlet port 534 and/or the resin outlet port 536 to assist in suctioning the upper diaphragm into the cavity 406. The upper diaphragm 804 is suctioned against the contours of the cavity 406, where the upper diaphragm 804 contacts and seals with the secondary sealant 900.

At block 1214, excess portions of the diaphragm assembly 803 (e.g., the upper and lower diaphragms 804, 806) are removed. The excess portions may be the portions around (outside) of the modular tool insert 404 (i.e., the portions covering the docking station 402 that are outside of the modular tool insert 404). For example, as shown in FIGS. 10B and 11B, the knife 1110 may be used to cut the excess portions of the upper and lower diaphragms 804, 806. In some examples, the upper and lower diaphragms 804, 806 are cut along the first and second diaphragm cutting grooves 532, 604.

At block 1216, the modular tool insert 404, along with the diaphragm assembly 803 (e.g., the upper and lower diaphragms 804, 806) and the preform 802 are removed from the docking station 402. For example, the modular tool insert 404 may be lifted (e.g., manually, via a hoist, etc.) from the docking station. In some examples, prior to removing the modular tool insert 404, one or more fastening devices may be undone to release the modular tool insert 404 from the docking station 402. In some examples, the preform 802 is to be cured in an oven. In such examples, the modular tool insert 404, along with the diaphragm assembly 803 and the preform 802, are transferred to an oven. The modular tool insert 404 may be transferred via a cart, for example. In some examples, a lifting device (e.g., a hoist) is used. The docking station 402 may remain at a forming station and used in a subsequent forming operation.

The example method 1200 continues in FIG. 12B. In some examples, a resin infusion process is performed. In such examples, at block 1217, the preform 802 is infused with the liquid resin from the resin supply 548. For example, the second vacuum device 552, which is connected to the resin outlet port 536, is activated. The vacuum created by the second vacuum device 552 draws the liquid resin from the resin inlet port 534 through the preform 802 toward the resin outlet port 536. The first vacuum device 544 continues to apply a vacuum to maintain the preform 802 in the shape of the mold 410 during the resin infusion process. The resin infusion process occurs after forming the preform 802 on the mold 410 (block 1212). In some examples, the resin infusion process occurs after the modular tool insert 404 is removed from the docking station 402. The resin infusion process may occur prior to placing the preform 802 in the oven or after the preform 802 is placed in the oven (but before curing). In other examples, such as with pre-impregnated carbon or wet layup, no resin infusion process is performed.

At block 1218, the modular tool insert 404, along with the diaphragm assembly 803 and the preform 802, is placed into the oven 1000, as shown in FIGS. 10D and 11D, and the preform 802 may be cured. As disclosed above, in some examples, resin infusion may continue while the preform 802 is in the oven 1000, prior to curing (e.g., heating). The oven 1000 may heat the preform 802 to a desired temperature (one time or multiple times) for curing. As such, the preform 802 remains disposed on the modular tool insert 404 while curing in the oven 1000. In some examples, while the preform 802 is curing in the oven 1000, the first vacuum device 544 continues to apply a vacuum at the vacuum port 538 to maintain the preform 802 in the shape of the mold 410. The curing phase causes the preform 802, with the resin, to set and/or otherwise transition to hardened preform 802. The hardened preform 802 maintains the shape of the mold 410.

After curing the preform 802 in the oven 1000 for a desired curing time, at block 1220, the modular tool insert 404, along with the diaphragm assembly 803 and the preform 802, are removed from the oven 1000. The modular tool insert 404 may be removed by a hoist and transferred on a cart, for example. In some examples, the preform 802 is allowed to further cure (e.g., harden) outside of the oven 1000.

At block 1222, the vacuum is deactivated. For example, the first vacuum device 544 may be deactivated, which ceases the vacuum in at the vacuum port 538. Additionally, the second vacuum device 552 is deactivated. The first and second vacuum devices 544, 552 and/or the resin supply 548 may be disconnected from the modular tool insert 404.

If desired, at block 1224, the hardened preform 802 is trimmed. In some examples, the modular tool insert 404, along with the diaphragm assembly 803 and the hardened preform 802, are transferred to a trimming area where the trimming operation(s) occur(s). The hardened preform 802 is trimmed while disposed on the mold 410 of the modular tool insert 404. For example, as shown in FIGS. 10E and 11E, the CNC machine 1112 may be used to trim the edges of the hardened preform 802 while the hardened preform 802 rests on the mold 410. In some examples, the CNC machine 1112 trims the edges of the hardened preform 802 along the first and second trimming grooves 528, 600. The CNC machine 1112 cuts through the upper and lower diaphragms 804, 806 as well as the hardened preform 802. In other examples, other types of trimming tools may be used At block 1226, the hardened preform 802 is removed from the modular tool insert 404 and separated from the diaphragm assembly 803. The hardened preformed 802 may be the final product. In other examples, one or more other operations may be performed on the hardened preform 802, such as painting, further trimming, etc. The example method 1200 may then be repeated again using the modular tool insert 404.

From the foregoing, it will be appreciated that example apparatus, systems, methods, and articles of manufacture have been disclosed that increase throughput of composite part manufacturing and reduce costs associated with composite part manufacturing. Example modular tool inserts disclosed herein can be used during multiple phases of the composite part manufacturing process, which reduces the number of additional tools required to complete the process and reduces the time spent moving parts between tools as required in known processes. The examples disclosed herein also result in less expensive tooling, which reduces the overall costs associated with the composite part manufacturing process. Further, while the examples disclosed herein are described in connection with composite part manufacturing, the examples disclosed herein can be similarly implemented in connection with other types of manufacturing that utilize a mold.

The following paragraphs provide various examples of the examples disclosed herein:

Example 1 includes method including disposing a preform and a diaphragm assembly above a tool housing, and disposing the diaphragm assembly on an upper perimeter surface of the tool housing. The tool housing defines a cavity. The tool housing includes a docking station and a modular tool insert removably coupled to the docking station. The modular tool insert includes a mold disposed within the cavity. The method of Example 1 also includes forming the preform onto the mold by applying a vacuum within the cavity that pulls the diaphragm assembly, along with the preform, into the cavity such that the preform conforms to a shape of the mold, removing excess portions of the diaphragm assembly from around the modular tool insert, and removing the modular tool insert, along with the diaphragm assembly and the preform, from the docking station.

Example 2 includes the method of Example 1, further including, after removing the modular tool insert from the docking station, transferring the modular tool insert, along with the diaphragm assembly and the preform, to an oven, and curing the preform in the oven while the preform is disposed on the modular tool insert, wherein curing the preform transforms the preform into hardened preform.

Example 3 includes the method of Example 2, further including, while curing the preform in the oven, continuing to apply the vacuum.

Example 4 includes the method of Examples 2 or 3, further including, after curing the preform in the oven, removing the modular tool insert, along with the diaphragm assembly and the hardened preform, from the oven, and trimming the hardened preform while the hardened preform is disposed on the mold of the modular tool insert.

Example 5 includes the method of any of Examples 1-4, further including, after removing the modular tool insert from the docking station, infusing the preform with liquid resin. The diaphragm assembly includes an upper diaphragm and a lower diaphragm. The preform is disposed between the upper and lower diaphragms.

Example 6 includes the method of Example 5, wherein the modular tool insert includes a resin inlet port to supply the liquid resin and a resin outlet port to apply a vacuum. The lower diaphragm includes an inlet opening aligned with the resin inlet port and an outlet opening aligned with the resin outlet port.

Example 7 includes the method of Example 6, wherein infusing the preform with the liquid resin includes applying a vacuum at the resin outlet port to draw the liquid resin from the resin inlet port and through the preform toward the resin outlet port.

Example 8 includes the method of any of Examples 1-7, further including disposing a primary sealant around the upper perimeter surface. The primary sealant is to seal the diaphragm assembly to the upper perimeter surface.

Example 9 includes the method of Example 8, further including disposing a secondary sealant on the mold of the modular tool insert. The secondary sealant is to seal the diaphragm assembly to the mold when the diaphragm assembly is pulled into the cavity.

Example 10 includes the method of Example 9, wherein the vacuum is applied via a vacuum port formed on the mold. The vacuum port is disposed within an area bounded by the secondary sealant.

Example 11 includes the method of any of Examples 1-10, wherein the preform includes at least one of dry carbon fabric, pre-impregnated carbon fabric, or wet laid carbon fabric.

Example 12 includes a tool housing for use in a composite part manufacturing process. The tool housing includes a docking station and a modular tool insert removably coupled to the docking station. The docking station and the modular tool insert, when coupled, form a cavity with an upper perimeter surface around the cavity. The modular tool insert includes a mold. The mold is disposed within the cavity when the modular tool insert is coupled to the docking station.

Example 13 includes the tool housing of Example 12, wherein the modular tool insert includes a vacuum port formed on a side of the mold.

Example 14 includes the tool housing of Examples 12 or 13, wherein the modular tool insert includes a resin inlet port and a resin outlet port. The resin inlet port is to supply liquid resin and the resin outlet port is to draw the liquid resin through a preform toward the resin outlet port.

Example 15 includes the tool housing of Example 14, wherein the modular tool insert includes a first conduit connected to the vacuum port, a second conduit connected to the resin inlet port, and a third conduit connected to the resin outlet port, and wherein the first, second, and third conduits are accessible at an end of the modular tool insert.

Example 16 includes the tool housing of any of Examples 12-15, wherein the modular tool insert includes a trimming groove formed in a side of the mold.

Example 17 the tool housing of any of Examples 12-16, wherein the modular tool insert includes a diaphragm cutting groove formed in a side of the mold.

Example 18 includes a modular tool insert including a first end block, a second end block, and a mold coupled between the first end block and the second end block. The first and second end blocks are shaped to be received by a docking station.

Example 19 includes the modular tool insert of Example 18, further including a vacuum port formed in a side of the mold.

Example 20 includes the modular tool insert of Example 19, further including a resin inlet port formed in the first end block and a resin outlet port formed in the second end block.

Although certain example methods, systems, apparatus, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A method comprising:
    disposing a preform and a diaphragm assembly above a tool housing;
    disposing the diaphragm assembly on an upper perimeter surface of the tool housing, the tool housing defining a cavity, the tool housing including a docking station and a modular tool insert removably coupled to the docking station, the modular tool insert including a mold disposed within the cavity, the modular tool insert having a vacuum port;
    forming the preform onto the mold by applying a vacuum at the vacuum port within the cavity that pulls the diaphragm assembly, along with the preform, into the cavity such that the preform conforms to a shape of the mold;
    removing excess portions of the diaphragm assembly from around the modular tool insert;
    removing the modular tool insert, along with the diaphragm assembly and the preform, from the docking station; and
    after removing the modular tool insert from the docking station, continuing to apply the vacuum at the vacuum port to continue to suction the diaphragm assembly and the preform against the mold.

2. The method of claim 1, further including, after removing the modular tool insert from the docking station:
    transferring the modular tool insert, along with the diaphragm assembly and the preform, to an oven; and
    curing the preform in the oven while the preform is disposed on the modular tool insert, wherein curing the preform transforms the preform into a hardened preform.

3. The method of claim 2, further including, while curing the preform in the oven, continuing to apply the vacuum.

4. The method of claim 2, further including, after curing the preform in the oven:
    removing the modular tool insert, along with the diaphragm assembly and the hardened preform, from the oven; and
    trimming the hardened preform while the hardened preform is disposed on the mold of the modular tool insert.

5. The method of claim 1, further including, after removing the modular tool insert from the docking station, infusing the preform with liquid resin, wherein the diaphragm assembly includes an upper diaphragm and a lower diaphragm, the preform disposed between the upper and lower diaphragms.

6. The method of claim 5, wherein the modular tool insert includes a resin inlet port to supply the liquid resin and a resin outlet port to apply a vacuum, the lower diaphragm including an inlet opening aligned with the resin inlet port and an outlet opening aligned with the resin outlet port.

7. The method of claim 6, wherein infusing the preform with the liquid resin includes applying a vacuum at the resin outlet port to draw the liquid resin from the resin inlet port and through the preform toward the resin outlet port.

8. The method of claim 1, further including disposing a primary sealant around the upper perimeter surface, the primary sealant to seal the diaphragm assembly to the upper perimeter surface.

9. The method of claim 8, further including disposing a secondary sealant on the mold of the modular tool insert, the secondary sealant to seal the diaphragm assembly to the mold when the diaphragm assembly is pulled into the cavity.

10. The method of claim 9, wherein the vacuum port is disposed within an area bounded by the secondary sealant.

11. The method of claim 1, wherein the preform includes at least one of dry carbon fabric, pre-impregnated carbon fabric, or wet laid carbon fabric.

12. A method comprising:
    disposing a preform and a diaphragm assembly above a tool housing;
    disposing the diaphragm assembly on an upper perimeter surface of the tool housing, the tool housing defining a cavity, the tool housing including a docking station and a modular tool insert removably coupled to the docking station, the modular tool insert including a mold disposed within the cavity, the modular tool having a trimming groove formed on a side of the mold;
    forming the preform onto the mold by applying a vacuum within the cavity that pulls the diaphragm assembly, along with the preform, into the cavity such that the preform conforms to a shape of the mold;
    removing excess portions of the diaphragm assembly from around the modular tool insert;
    removing the modular tool insert, along with the diaphragm assembly and the preform, from the docking station; and
    after removing the module tool insert from the docking station, trimming the preform by moving a cutting tool along the trimming groove.

13. The method of claim 12, wherein the trimming groove is a first trimming groove and the side of the mold is a first side of the mold, the modular tool insert having a second trimming groove on a second side of the mold.

14. The method of claim 12, wherein the cutting tool is a router bit of a computer numerical control (CNC) machine.

15. The method of claim 12, further including, after removing the modular tool insert from the docking station and before trimming the preform:
    transferring the modular tool insert, along with the diaphragm assembly and the preform, to an oven; and
    curing the preform in the oven while the preform is disposed on the modular tool insert, wherein curing the preform transforms the preform into a hardened preform.

16. The method of claim 15, further including, while curing the preform in the oven, continuing to apply the vacuum.

17. A method comprising:
- disposing a primary sealant around an upper perimeter surface of a tool housing, the tool housing defining a cavity, the upper perimeter surface surrounding the cavity, the tool housing including a docking station and a modular tool insert removably coupled to the docking station, the modular tool insert including a mold disposed within the cavity;
- disposing a secondary sealant along one or more sides of the mold, the secondary sealant forming a complete or continuous path that bounds an area of the mold;
- disposing a preform and a diaphragm assembly above the tool housing;
- disposing the diaphragm assembly on the upper perimeter surface with the primary sealant such that the diaphragm assembly is sealed to the upper perimeter surface;
- forming the preform onto the mold by applying a vacuum within the cavity that pulls the diaphragm assembly, along with the preform, into the cavity such that the preform conforms to a shape of the mold and such that the diaphragm assembly contacts the secondary sealant to seal the diaphragm assembly assemble to the mold;
- removing excess portions of the diaphragm assembly from around the modular tool insert; and
- removing the modular tool insert, along with the diaphragm assembly and the preform, from the docking station.

18. The method of claim 17, wherein the secondary sealant includes double-sided tape.

19. The method of claim 17, wherein the secondary sealant includes mastic adhesive.

20. The method of claim 17, further including, after removing the modular tool insert from the docking station:
- transferring the modular tool insert, along with the diaphragm assembly and the preform, to an oven; and
- curing the preform in the oven while the preform is disposed on the modular tool insert, wherein curing the preform transforms the preform into a hardened preform.

* * * * *